United States Patent [19]

Shinohara et al.

[11] Patent Number: 5,425,834
[45] Date of Patent: Jun. 20, 1995

[54] AUTOMATIC FEEDER OF ADHESIVE SHEET MATERIAL

[75] Inventors: Masaru Shinohara; Masashi Kojima, both of Tokyo; Koichi Kawamori, Kyoto; Toru Narimatsu, Osaka, all of Japan

[73] Assignees: Tsukishima Kikai Kabushiki Kaisha; Sekisui Kagaku Kogyo Kabushiki Kaisha, both of Osaka, Japan

[21] Appl. No.: 39,173

[22] PCT Filed: May 29, 1992

[86] PCT No.: PCT/JP92/00707

§ 371 Date: Apr. 15, 1993

§ 102(e) Date: Apr. 15, 1993

[51] Int. Cl.⁶ .............................................. B26D 5/28
[52] U.S. Cl. ................................. 156/360; 156/264; 156/355; 156/361; 156/517; 156/558; 156/584
[58] Field of Search ............... 156/344, 584, 264, 517, 156/558, 353, 355, 360, 361; 264/40.4, 139, 152

[56] References Cited

U.S. PATENT DOCUMENTS

| | | | |
|---|---|---|---|
| 3,668,047 | 6/1972 | Heller | 156/584 X |
| 4,571,320 | 2/1986 | Walker | 264/40.1 |
| 4,822,445 | 4/1989 | Yamaguchi | 156/344 X |
| 4,946,551 | 8/1990 | Ishige et al. | 156/380.9 X |
| 4,995,933 | 2/1991 | Brussel | 156/584 X |
| 5,000,816 | 3/1991 | Seki et al. | 156/584 |
| 5,045,250 | 9/1991 | Brussel | 264/152 X |

FOREIGN PATENT DOCUMENTS 1437235 11/1988 U.S.S.R. ............... 264/40.4

Primary Examiner—Mark A. Osele
Attorney, Agent, or Firm—Armstrong, Westerman, Hattori, McLeland & Naughton

[57] ABSTRACT

An apparatus for feeding a long adhesive sheet material protected with parting films on both side into a forming machine by a specified portion each without any manual labor. An adhesive sheet material (10) let off through pinch rolls (102, 102) in a sheet cutter (100) is measured of its length by an encoder, and is cut in a preset length. A cut segment (15) of the adhesive sheet material is conveyed by a sheet cutter conveyor (200) to a specified position, where it is stacked up on a stacking truck (400) waiting above a weighing scale (500) by a suction and transfer device (300). When stacking of segments (15) is over, the weight is measured by the weighing scale (500). When this measurement agrees with the necessary weight, the specified number of segments (15) are carried up to the waiting position of a charger (600) by the stacking truck (400), and are charged into the specified position of a forming machine (20) by the charging machine (600).

12 Claims, 19 Drawing Sheets

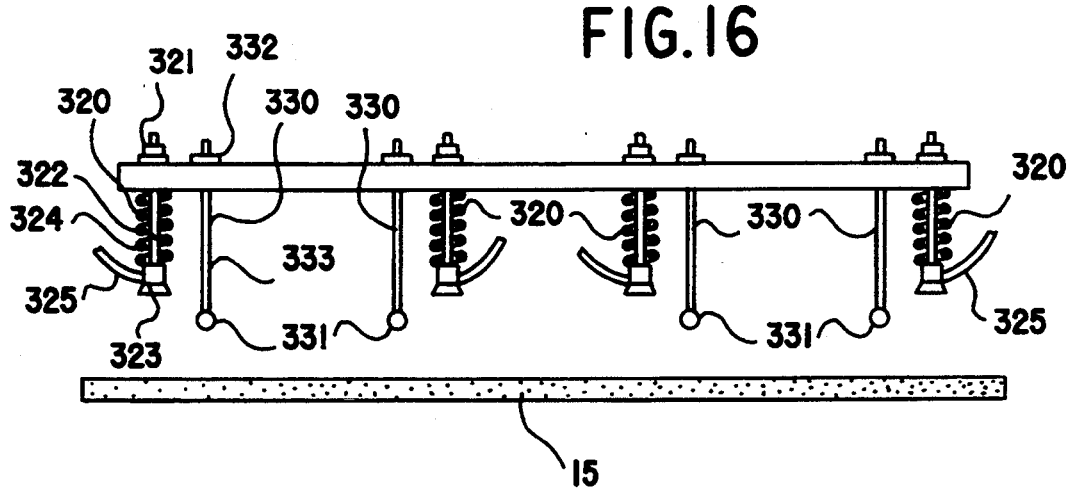
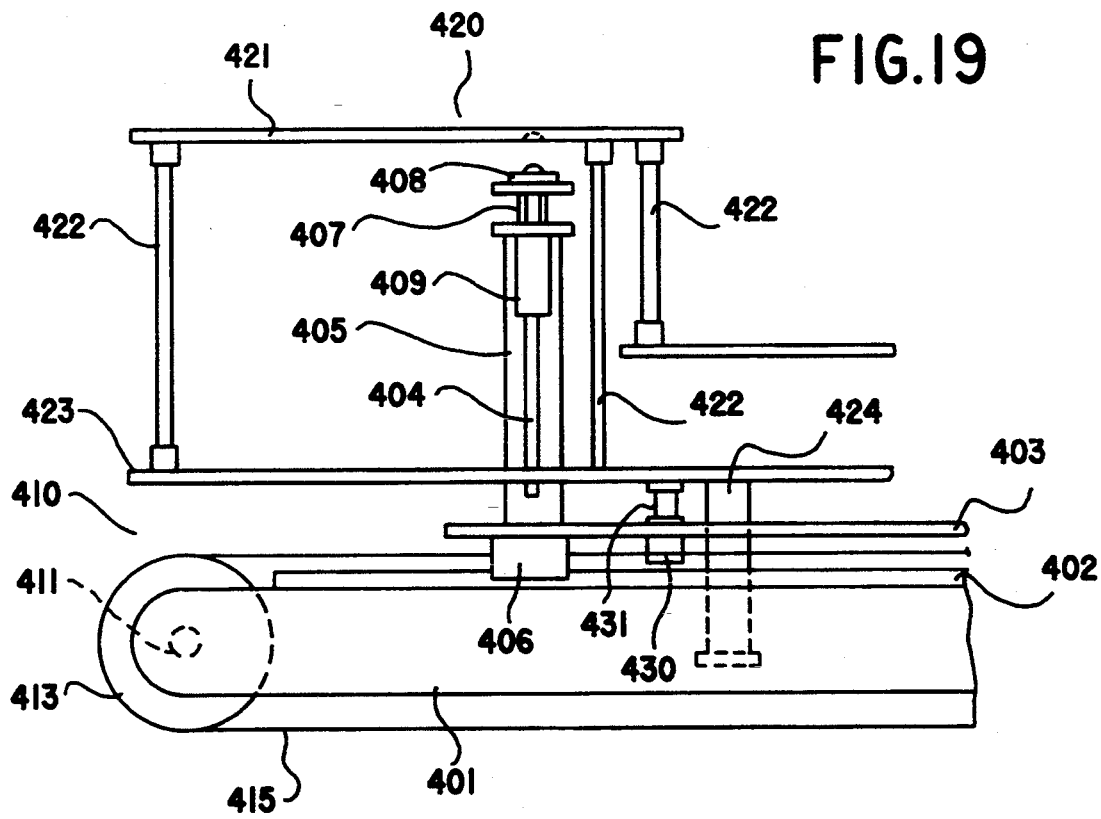

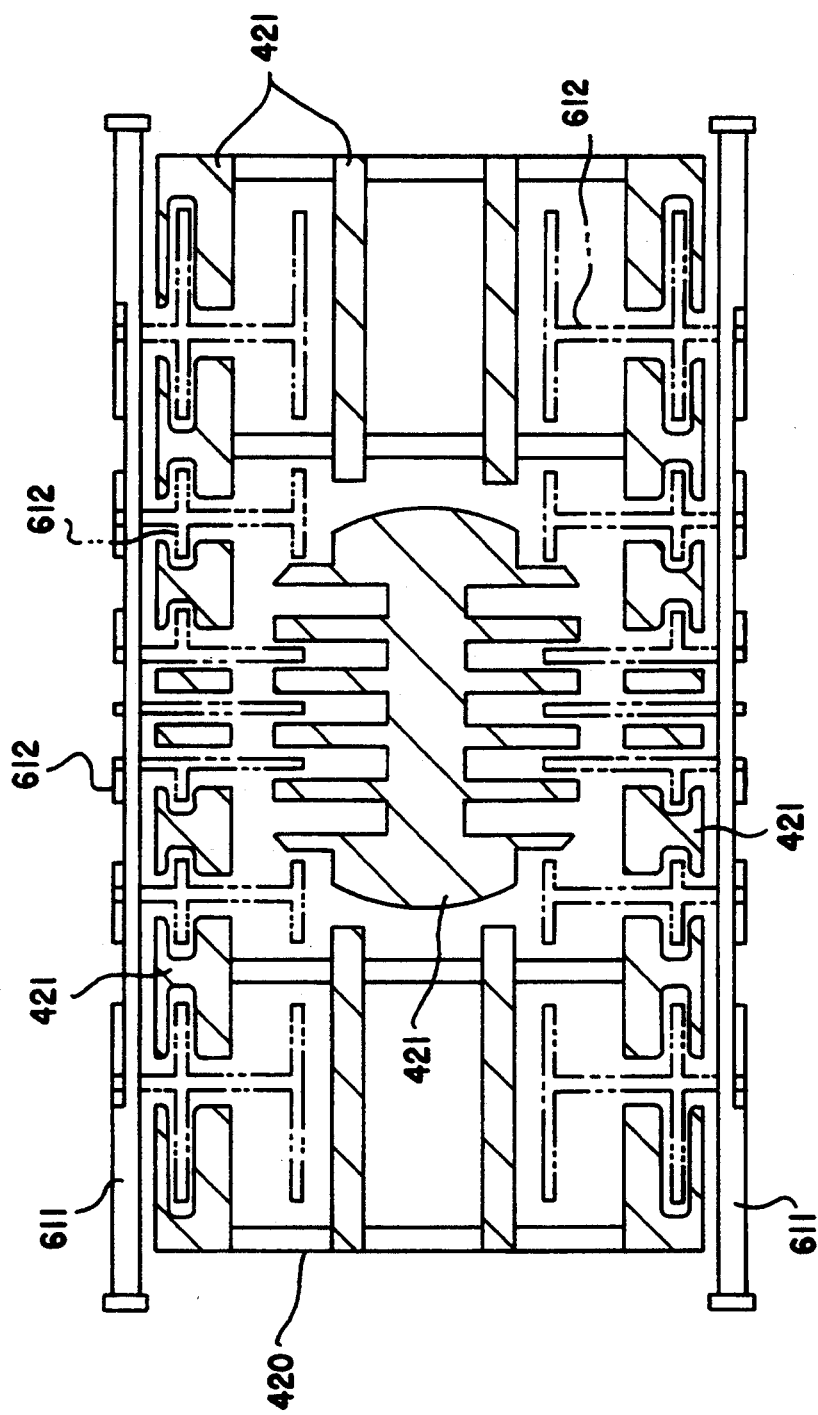

AUTOMATIC FEEDER OF ADHESIVE SHEET MATERIAL

FIELD OF THE INVENTION

The present invention relates to an automatic feeder of adhesive sheet material suited to supply of adhesive sheet material, for example, sheet molding compound as forming material for manufacturing reinforced plastic product, to a forming machine.

BACKGROUND OF THE INVENTION

Hitherto, sheet molding compound (SMC) has been widely used as the forming material for manufacturing reinforced plastic products such as bath tubs. This SMC is prepared by mixing liquid unsaturated polyester resin and reinforcing material such as chopped strand, filler, and thickener, and forming in a sheet by decreasing its moisture content thereby becoming adhesive. Accordingly, as shown in FIG. 26 and FIG. 27, the SMC 10 is usually formed in an SMC sheet 12 covering its upper surface and lower surface with a polyethylene or other parting film 11 broader than the width of the SMC 10, and is wound around a core tube 14 to be formed in an SMC roll 13, or folded in a pleated form which is not particularly shown.

Forming of a reinforced plastic product from such SMC comprises the step of cutting out a necessary portion for one forming from the SMC sheet, feeding the cut segment of SMC into the forming machine, heating and pressurizing the SMC segment in the machine, and curing.

In this process, until the SMC is supplied to the forming machine, the SMC undergoes a step of peeling off the upper and lower parting films from the SMC sheet 12 let off from the SMC roll 13 and cutting the SMC to a specific length, a step of transferring the obtained segment of SMC to a weighing device, a step of weighing to see if the weight of the SMC segment has reached a specific weight necessary for forming, and a step of charging the weighed segment of SMC into the forming machine.

In the step of cutting the SMC sheet, conventionally, a sheet cutter 800 as shown in FIG. 28 has been used. The sheet cutter 800 comprises a receiving stand 801 for rotatably pivoting the core tube 14 of the SMC roll 13, a pair of pinch rolls 802, 802 for pinching the SMC sheet 12 supported and pulled out from the receiving stand 801 from above and beneath and letting off to the downstream side, take-up rolls 803, 803 for taking up the peeled parting films 11, 11 at the let-off side of the pinch rolls 802, 802, and a cutting blade 804 for cutting the SMC in the widthwise direction (the direction orthogonal to the sheet of paper in FIG. 28). The SMC sheet 12 is pinched by the upper and lower pinch rolls 802, 802, and is let off to the downstream side as they are simultaneously rotated and driven in mutually opposite directions, while the cutting blade 804 fixed to a holder 805 is run in the widthwise direction of the SMC 10 to cut it sequentially into segments 15.

In FIG. 28, meanwhile, numeral 806 denotes a connection table, 807 is a guide moll for leading the SMC sheet 12 onto the connection table 806, and 900 is a cut sheet conveyor for conveying the segment 15 of the SMC 10 supplied from the sheet cutter 800 to a specific position.

Besides, in the step of transferring the SMC segment obtained by the sheet cutter to the weighing device, handling is difficult because the SMC is adhesive, and therefore since the segment cannot be sent into the specified position of the weighing device without damaging by general conveying equipment, conventionally, the segment of SMC was manually transferred from the cut sheet conveyor to the weighing device.

In the weighing step, the weight of the SMC supplied to the forming machine must be accurately determined according to the reinforced plastic product to be formed, or the reinforced plastic products cannot be manufactured in specified weight balance. For this purpose, for example, a weighing method was purposed in the Japanese Laid-Open Patent (KOKAI) No. H02-121811. That is, the SMC necessary for one product is successively cut in specific length, and each cut segment of SMC is weighed, while the weights are cumulatively added up, and in the final cutting step, the cutting length of the final segment is increased or decreased depending on the hitherto total weight of segments and the weight necessary for one product.

In the charging step, considering the fluidity of the SMC in the forming die in the forming machine, the SMC segment must be correctly put into the predetermined charging position of the forming die. However, since it is hard to handle the SMC, conventionally, the SMC was manually charged into the forming die. Recently, to improve this point, for example, it is proposed in the Japanese Patent Publication (KOKOKU) No. H02-36371 which relates to handling technique for skewering stacked pieces of SMC by rotating a spiral tool, conveying up to the forming die in this state, and rotating the tool reversely on the forming die to put in. It is also known to charge the SMC segments into the forming die by using a telescopic conveyor.

Thus, the procedure for feeding the SMC into the forming machine comprises complicated steps, and a part of the steps still depends on manual operation, and therefore the productivity is inferior. Besides, manual handling of SMC requires hard labor and is heavy in burden of workers because even a segment of SMC is very heavy. In addition, adverse effects on human health by the reinforcing materials contained in the SMC must be considered. In this background there is a keen demand fop an automatic feeder of SMC fully automating all these steps.

For fully automating all steps, the conventional devices may be used in the already automated steps, but each device has its own problems as discussed below, and they may not be employed directly.

More specifically, in the sheet cutter 800 used in the step of cutting the SMC sheet, the parting films 11, 11 cannot be neatly peeled off the SMC sheet 12. That is, if there is any local thick part in the resin paste drawn out duping storage of the roll on the SMC sheet 12, or deviated crease or folding of the end portion in the parting film, if attempted to peel off the parting films 11, 11 along the pinch rolls 802, 802, the SMC 10 may be taken, up together with the parting films 11, 11.

In the conventional weighing method in the weighing step, the weight of each segment is weighed and added up to stack up the segments of the SMC fop one product, and the errors of the weighing devices may be accumulated to increase, and a large weighing error may result in. When feeding the final segment, the error becomes large due to fluctuations of the unit length weight, and the weight precision is lowered.

In the SMC charging mechanism mentioned about in the charging step, since the SMC segments are skewered by a detachable tool, and penetration holes are formed in the segments, and they may cause pinholes in the products, and the product defective rate may be increased. In the telescopic conveyor, when the charging height becomes higher, it is difficult to charge the segment precisely into the specified position of the forming die, which is another factor to raise the product defective rate.

In the light of the above problems of the conventional devices, it is hence a primary object of the invention to present an automatic feeder of adhesive sheet material capable of automating fully in all steps from cutting to charging.

SUMMARY OF THE INVENTION

To achieve the above object, the invention presents an automatic feeder of adhesive sheet material for feeding a long adhesive sheet material having both sides protected with parting films into a forming machine by each specific weight, comprising segment feeding means for separating parting films from both sides of the adhesive sheet material, cutting the adhesive sheet material cleared from the parting films into segments of specified size sequentially, and sending out, conveying means for receiving the segments sent out from the segment feeding means and conveying to specified position, transfer and stacking means for transferring a plurality of segments conveyed up to the specific position by the conveying means to a preset segment weighing position remote from the conveying means, and stacking up the plurality of segments at the segment weighing position, weighing means for weighing the total weight of the segments stacked up by the transfer and stacking means, being installed at the segment weighing position, refilling means for additionally feeding refill segments to cover for the shortage form the segment feeding means, if the total weight of the segments weighed by the weighing means is less than the specified weight, and segment charging means for discharging the segments of specific weight in stacked state after weighing by the weighing means, or the segments in stacked state after reaching the specified weight by supplement with refill segments, in batch from the segment weighing position, and charging into the forming machine.

BRIEF DESCRIPTION OF THE DRAWINGS

FIG. 16 is a schematic front view showing the state of releasing the segment by suction means, FIG. 19 is a magnified view of part Y in FIG. 18, FIG. 20 is a plan view showing the constitution of segment receiving means for composing a part of the transfer and stacking means, together with the charging arm for composing the segment charging means.

DESCRIPTION OF THE PREFERRED EMBODIMENTS

Figure 1:
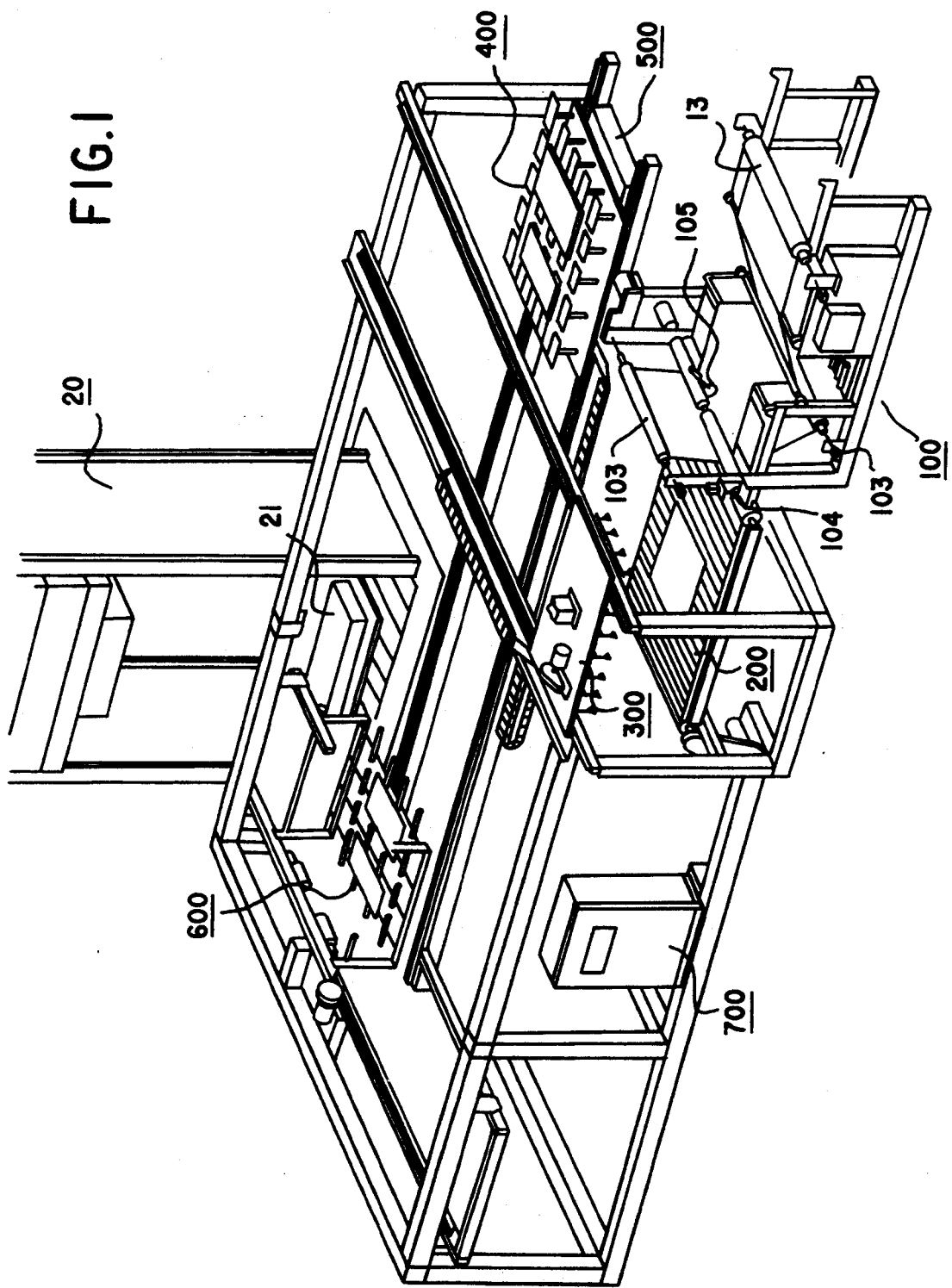
FIG. 1 is a schematic perspective view showing an entire structure of an automatic feeder of adhesive sheet material of the invention.

Referring now to the drawings, some of the preferred embodiments of the invention are described in detail below.

The SMC formed in a roll is used as the adhesive sheet material in the following explanations, and the operation of feeding the SMC into a press machine which is a forming machine is described.

Figure 2:
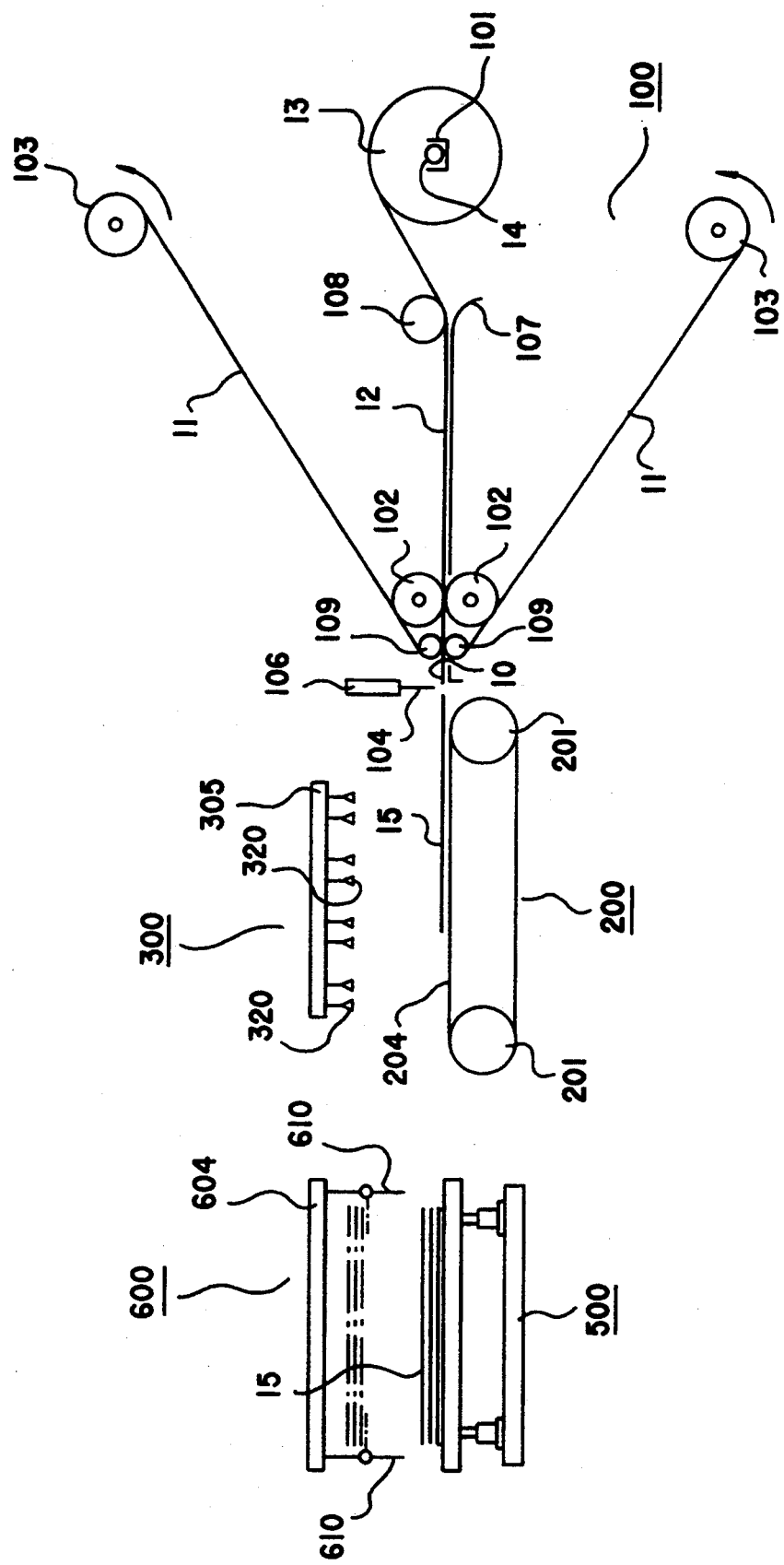
FIG. 2 is a side view schematically showing the entire structure.

The entire structure of the automatic feeder of adhesive sheet material of the invention is shown in FIG. 1 and FIG. 2. FIG. 1 is a schematic perspective view of the apparatus, and FIG. 2 is a side view schematically showing the constitution of the apparatus.

This apparatus is mainly composed of a sheet cutter 100, a cut sheet conveyor 200, a suction and transfer device 300, a stacking truck 400, a weighing scale 500, a charging device 600, and a control device 700 for controlling the operations of these components 100 to 600. In the drawing, numeral 20 denotes a press machine.

The constituent parts are individually described below.

The sheet cutter 100 composes the segment feeding means in the invention, and is designed to let off the SMC 10 from the SMC roll 13, peel off the parting films 11, 11 from its both sides, and cut the SMC 10 cleared from the parting films 11, 11 sequentially into segments 15 of specified size.

Figure 3:
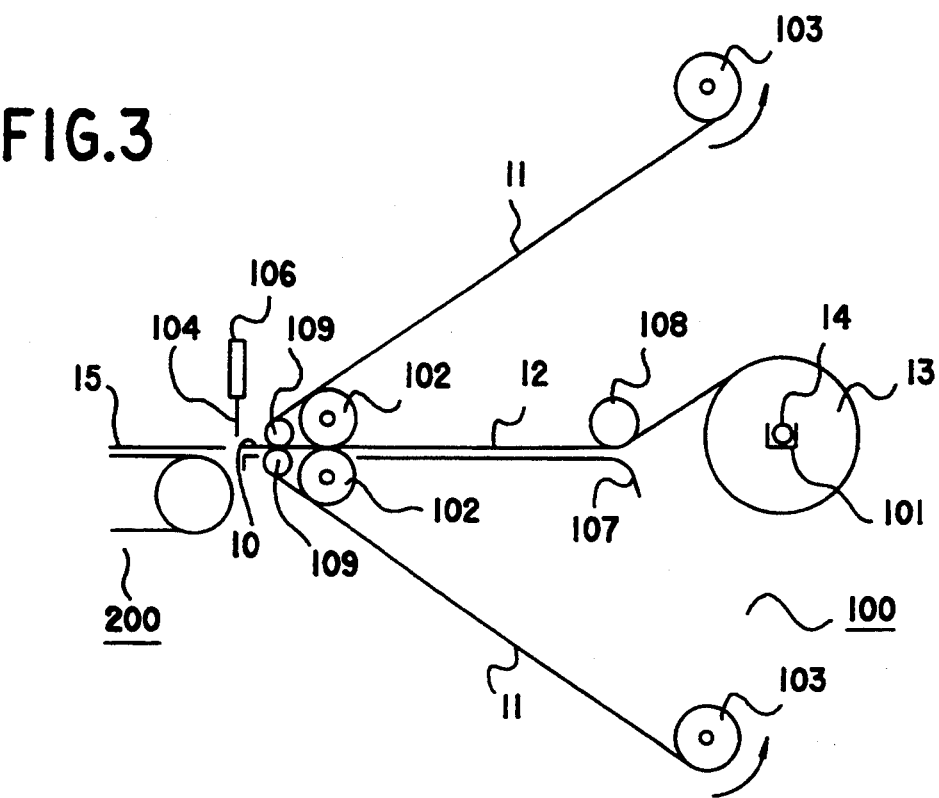
FIG. 3 is a schematic side view showing the constitution of the segment feeding means together with a part of conveying means.

The sheet cutter 100 comprises, as shown in FIG. 2 and FIG. 3, a receiving stand 101 for rotatably pivoting the core tube 14 of the SMC roll 19, a pair of pinch rolls 102, 102 for pinching the SMC sheet 12 supported and dragon out by the receiving stand 101 from above and below and letting off, a pair of parting rolls 109, 109 for separating the parting films 11, 11 from the SMC sheet 12 at the let-off side of the pinch rolls 102, 102, take-up rolls 103, 103 for taking up the parting films 11, 11 separated by the parting rolls 109, 109, a lateral cutting blade 104 for cutting the SMC 10 cleared from the parting films 11, 11 in the widthwise direction, and a longitudinal cutting blade 105 (see FIG. 1) for cutting the SMC in the longitudinal direction.

In addition, between the receiving stand 101 and the pinch rolls 102, 102, there is a guide roll 108 for leading the SMC sheet 12 onto a connection table 107.

A driving motor (not shown) is coupled to the lower pinch roll 102, and a gear transmission mechanism not shown is disposed between the upper and lower pinch rolls 102, 102. Therefore, the SMC sheet 12 is pinched between the upper and lower pinch rolls 102, 102, and is simultaneously let off to the downstream side as they are rotated and driven in the mutually opposite directions. An encoder (not shown) is mounted on the drive shaft of the lower pinch roll 102 so as to detect the number of revolutions. Therefore, the length of the SMC 10 let off by the pinch rolls 102, 102 is known from the number of revolutions.

Behind (at the downstream side of) the pinch rolls 102, 102, the parting rolls 109, 109 as parting members are rotatably supported, holding the SMC sheet 12 from above and below. The outside diameter of the parting roll 109 is formed smaller than the outside diameter of the pinch roll 102. As a result, the parting film 11 may be folded along the parting roll 109 at a large angle to the SMC 10, so that the parting film 11 may be separated securely.

At this time, when the parting roll 109 is smaller in diameter, the curvature is larger, and the parting film 11 can be folded at a larger angle to the SMC 10, which is advantageous for separation of the parting film 11, but considering the deflection, the diameter is preferred to be around 15 mm for the film width of 1.2 m.

The upper and lower parting rolls 109, 109 may be disposed by shifting back and forth by varying the distance from the pinch roll 102. In such a case, when the parting rolls 109, 109 are deviated back and forth, if the parting film 11 is folded in, the upper and lower films 11, 11 are separated individually, and entangling of the upper and lower parting films 11, 11 may be prevented.

Figure 4:
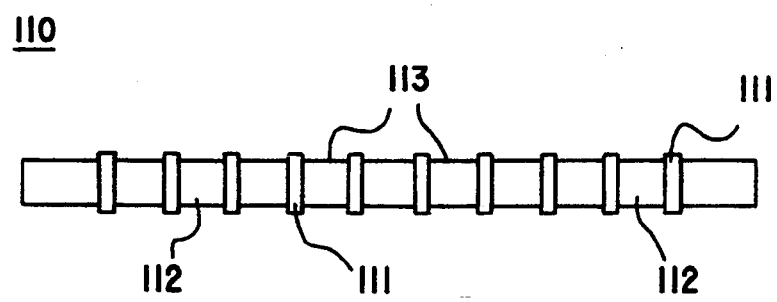
FIG. 4 is a front view showing a modified example of parting rolls shown in FIG. 3.
Figure 5:
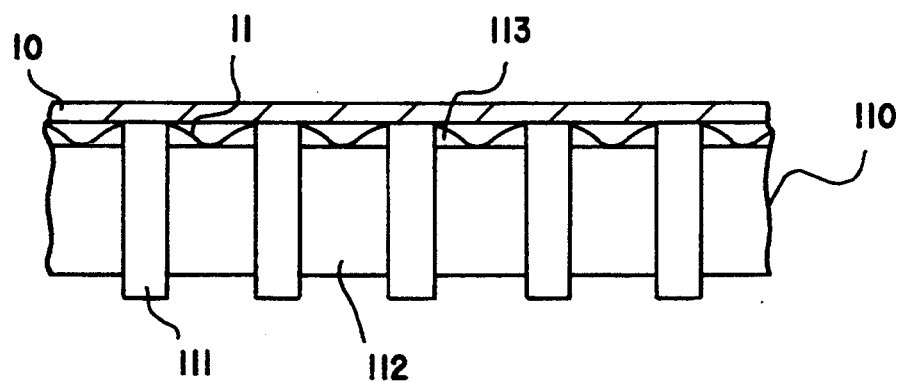
FIG. 5 is a magnified front view showing the parting state of the parting films by the parting rolls shown in FIG. 3.
Figure 6:
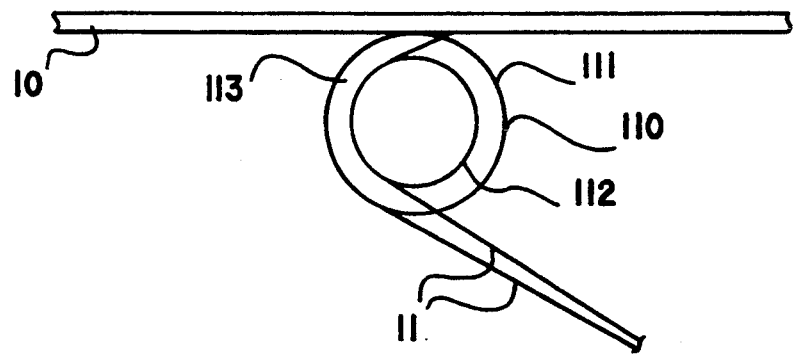
FIG. 6 is a side view showing the parting state of the parting films by the parting rolls shown in FIG. 3.

As shown in FIG. 4 through FIG. 6, a different parting roll 110 may be also used. In this parting roll 110, large diameter part 111 and small diameter part 112 are formed alternately to dispose multiple grooves 113 at specific intervals, and the parting film 11 folded along this parting roll 110 is deformed in the grooves 113 of the parting roll 110 by the take-up tension, and a part is preliminarily separated, and therefore the peeling positions of the parting films 11 are not aligned in the widthwise direction, and the parting resistances are dispersed, and the parting performance is further enhanced. In this case, the large diameter parts 111 may be inclined at a specific angle to the rotary shaft.

These parting rolls 109, 110, meanwhile, the shape is not limited to cylindrical, but may be polygonal, or air nozzles may be disposed against the parting rolls 109, 109 at the downstream side to inject compressed air between the parting films 11, 11 separated from the SMC 10, so that the parting operation by the parting rolls 109, 109 may be assisted.

Figure 7:
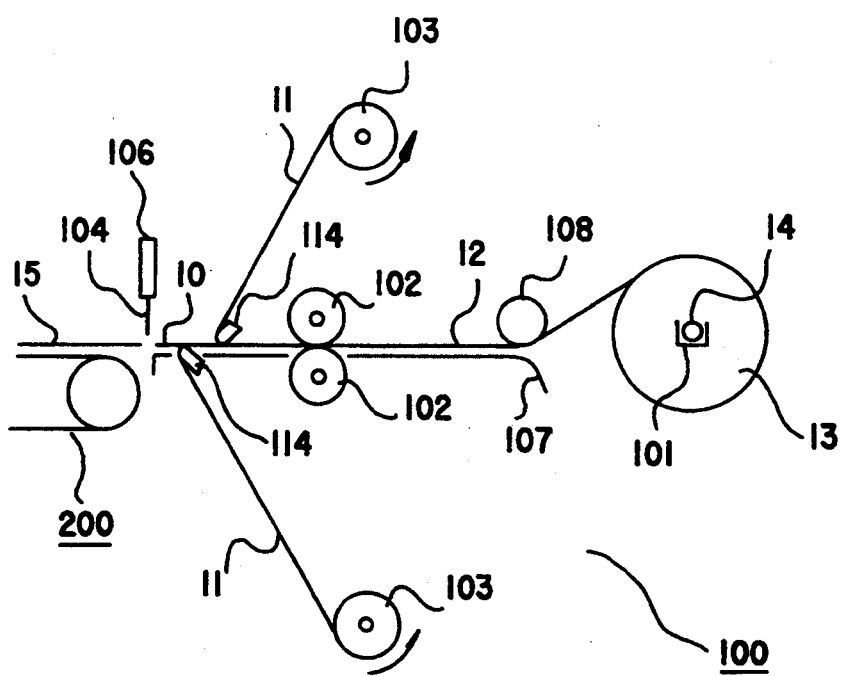
FIG. 7 is a schematic side view showing the constitution of segment feeding means having scraper-shaped parting members as other embodiment of segment feeding means, together with a part of conveying means.
Figure 8:
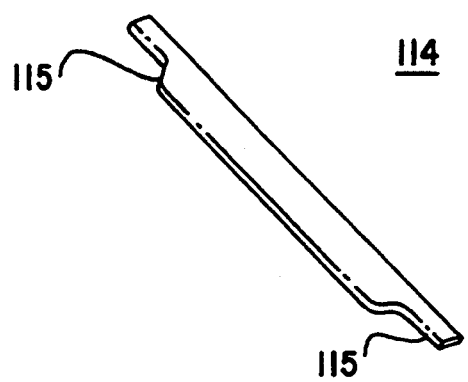
FIG. 8 is a magnified perspective view showing the scraper-shaped parting members shown in FIG. 7.
Figure 9:
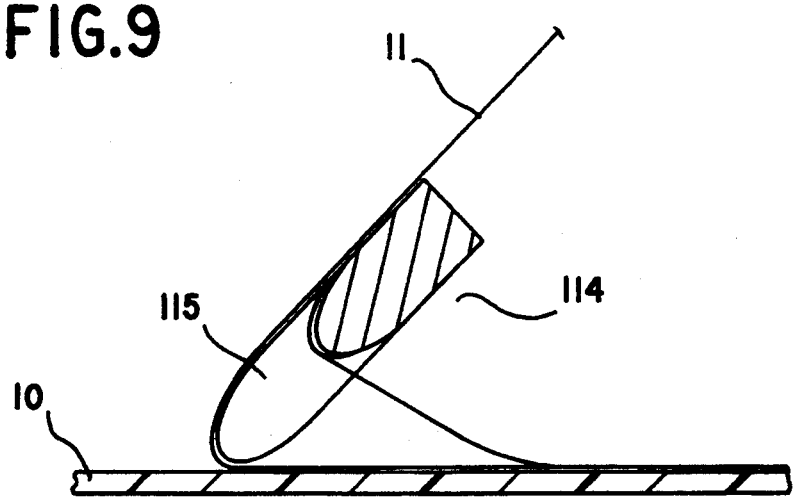
FIG. 9 is a magnified side view showing the parting state of parting films by the scraper-shaped parting members shown in FIG. 7.
Figure 10:
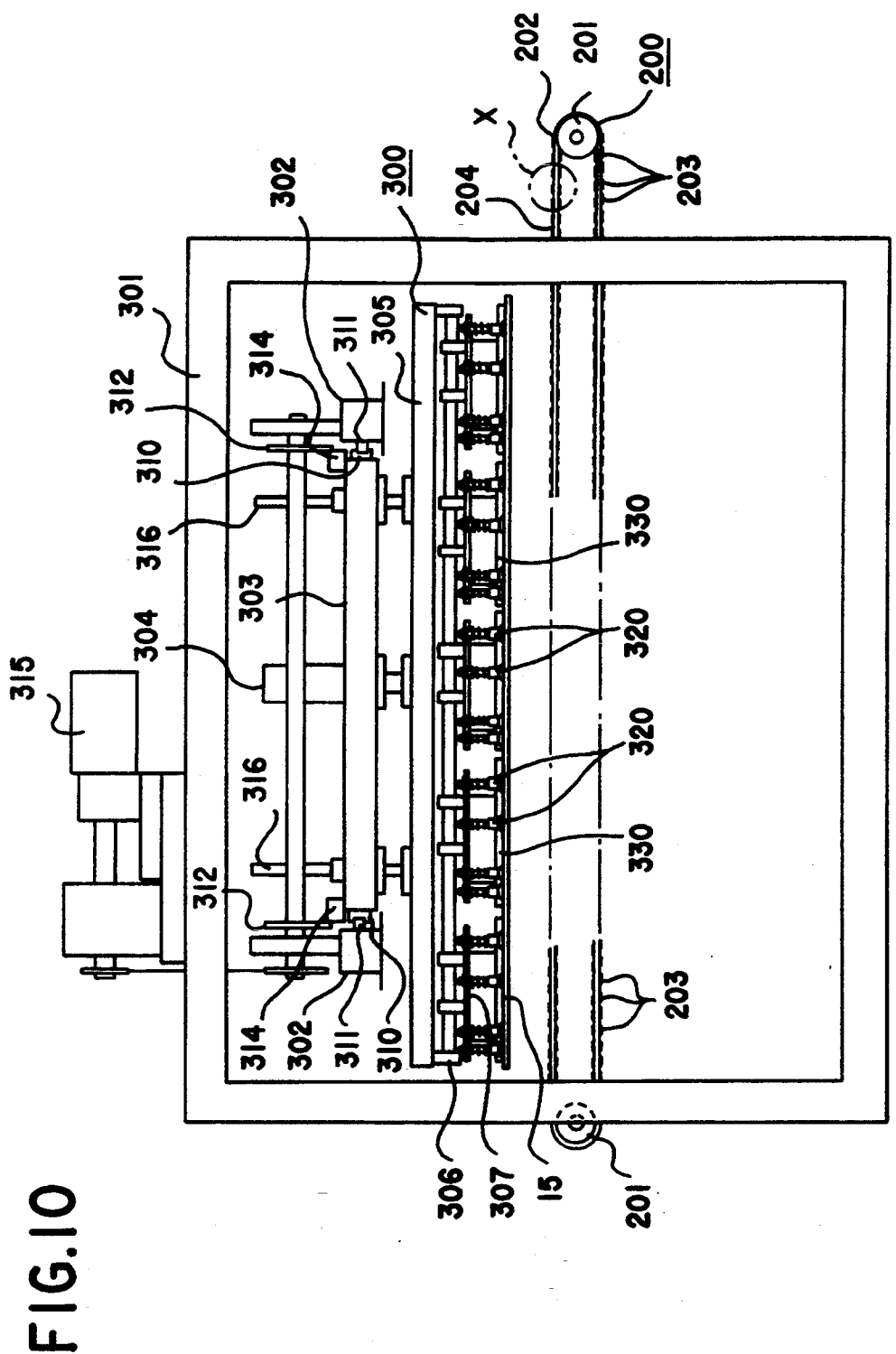
FIG. 10 is a schematic side view showing a part of the constitution of transfer and stacking means and the constitution of conveying means.
Figure 11:
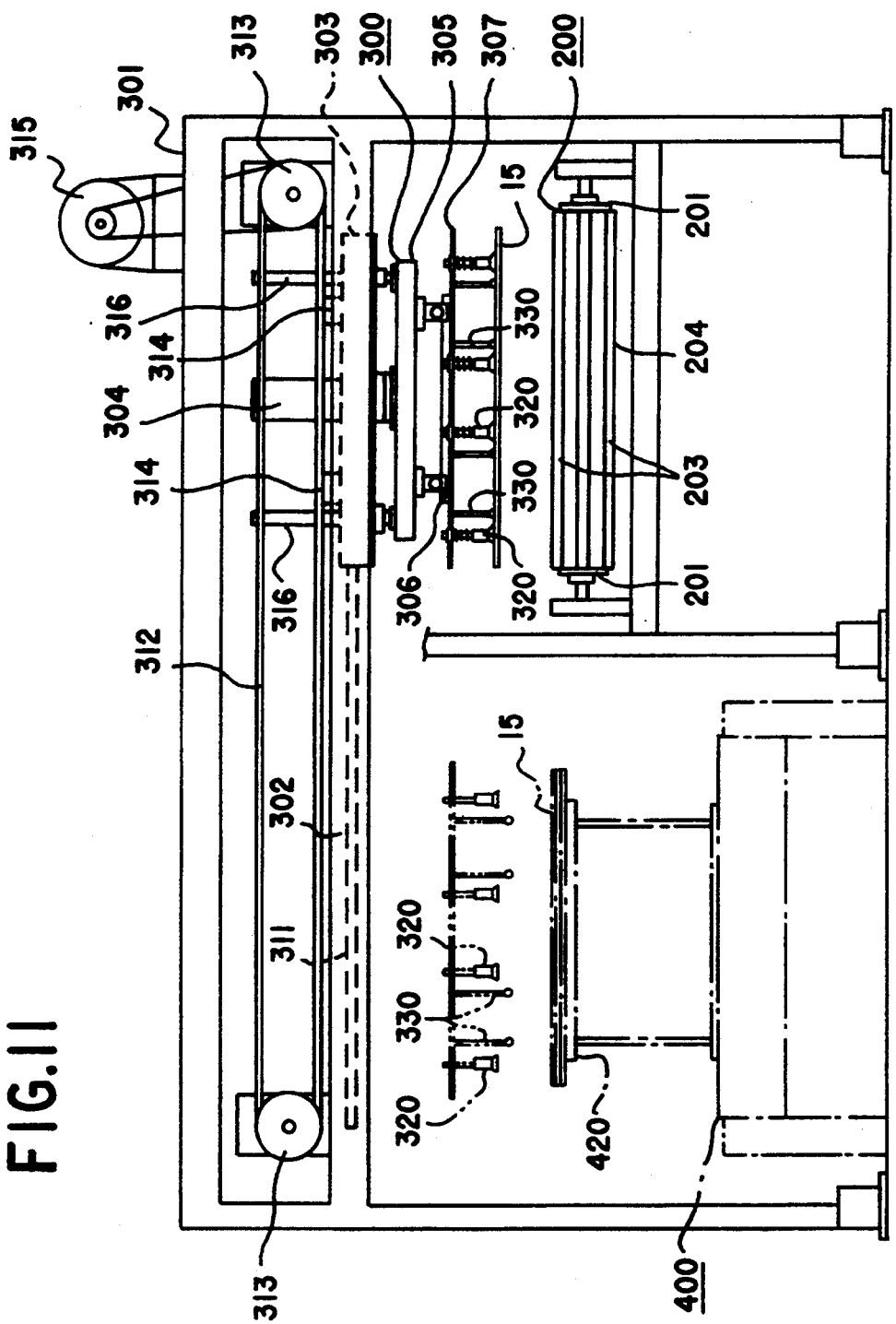
FIG. 11 is a schematic front view showing the constitution of transfer and stacking means and conveying means.
Figure 12:
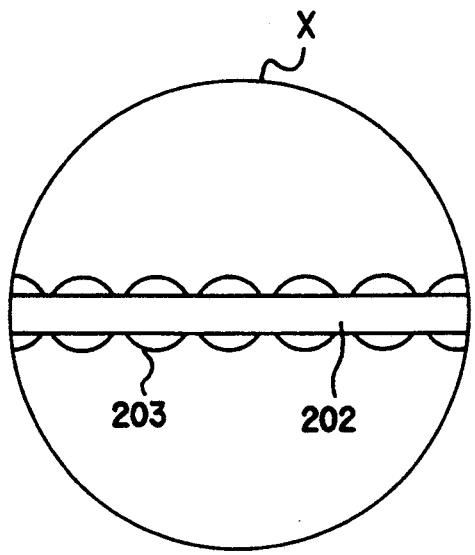
FIG. 12 is a magnified view of part X in FIG. 10.

The parting members may not be limited to rolls, but other shapes as shown in FIG. 7 through FIG. 9 may be also employed.

That is, at the downstream side of the pinch rolls 102, 102, a pair of scraper-shaped parting members 114, 114 (hereinafter called parting scrapers) as parting members are disposed above and below the SMC sheet 12. The parting scraper 114 is composed of a plate inclined at a specific angle to the SMC sheet 12, and an arc with a specific curvature is formed at its front end. The curvature of the front arc part is formed larger than the curvature of the pinch roll 102, and therefore by folding the parting film 11 along the front arc part of the parting scraper 114, the bending effort of the SMC sheet 12 in the bending direction is very small as compared with the rigidity of the SMC sheet 12, and only the parting film 11 is securely separated if the both ends of the SMC sheet 12 are created or folded.

At this time, if notches 115, 115 are formed in the parting scraper 112 by smoothing cutting out in part, a part of the parting film 11 is preliminarily separated by the take-up tension, and the separating positions are not aligned in the widthwise direction, and the parting performance is enhanced.

The upper and lower parting scrapers 114, 114 may be installed at the same distance, instead of installation by longitudinal deviation by varying the distance from the pinch roll 102 as shown in FIG. 7.

Besides, air nozzles may be disposed opposite to the downstream side of the parting scrapers 114 for composing the parting members, and by injecting compressed air between the SMC 10 and the parting film 11 parted from the SMC sheet 12, the parting operation of the parting film 11 may be assisted.

The lateral cutting blade 104 is fixed to the holder 106, and by running this holder 106 along a guide beam not shown disposed in the widthwise direction of the SMC 10, the SMC 10 may be cut to a desired length.

The longitudinal cutting blade 105 is disposed above the SMC 10 as shown in FIG. 1, and by lowering at an arbitrary position in the widthwise direction of the SMC 10, the SMC 10 may be cut along the longitudinal direction in a desired width.

The cut sheet conveyor 200 is described below.

The cut sheet conveyor 200 comprises the conveying means in the invention, and is designed to convey the segment 14 of the SMC 10 cut in specified size and sent in from the sheet cutter 10 to a specific position.

The cut sheet conveyor 200 is configured so that the conveying surface may be continuous to the connection table 107 of the cut sheet 100. The sheet cutter conveyor 200 comprises, as shown in FIG. 10 to FIG. 12 and FIG. 17, a pair of right and left chains 202 wound around between sprockets 201, 201, a conveying piece 204 on which both ends of plural pipes 203 (FIG. 12) as conveying surface are affixed, and a driving device (not shown) for driving the conveying piece 204 being linked to the sprocket 201. The cut sheet conveyor 200 has a conveying surface slightly broader than the width of the segment 14 of the SMC conveyed on the cut sheet conveyor 200.

Thus composed cut sheet conveyor 200 operates in synchronism with let-off of the SMC sheet 12 by the pinch rolls 102, 102 of the cut sheet conveyor 100, and is controlled to convey the segment 14 by the same distance as the let-off amount of the SMC sheet 12 in the sheet cutter 100.

The suction and transfer device 300 is described below.

The suction and transfer device 300 comprises a part of the transfer and stacking means of the invention, and is free to move in the direction orthogonal to the conveying direction of the sheet cutter conveyor 200, being designed to transfer the segment 15 of the SMC on the cut sheet conveyor 200 onto the stacking truck 400 located above the weighing scale 500.

The suction and transfer device 300 comprises a traveling frame 303 free to move along a mounting member 302 mounted on a frame 301, an elevatable lift frame 305 fixed to the lower end of the rod of the lift cylinder 304 disposed in the traveling frame 303, a holding member 307 disposed on the lift frame 305 through a linkage member 306, and plural suction members 320 and plural thrusting members 330 disposed on the holding member 307.

The traveling frame 303 has sliding members 310 affixed at both ends, which are slidably inserted and held in guide rails 311 disposed along the mounting member 302. Above both sides of the traveling frame 303, a pair of chains 312 are disposed through a sprocket 313, and both ends of the traveling frame 303 are affixed to the pair of chains 312 through affixing member 314. The chains 312 are designed to be free to be rotated and driven by a driving motor 315 mounted on the frame 301, and by rotating and driving the driving motor 315 in normal or reverse direction, the traveling frame 303 can be moved in the direction orthogonal to the conveying direction of the cut sheet conveyor 200 along the guide rail 311 through chains 312.

The lift frame 305 is designed to be elevated freely as being guided by the guide rod 316 by expansion and contraction of the lift cylinder 304.

Figure 13:
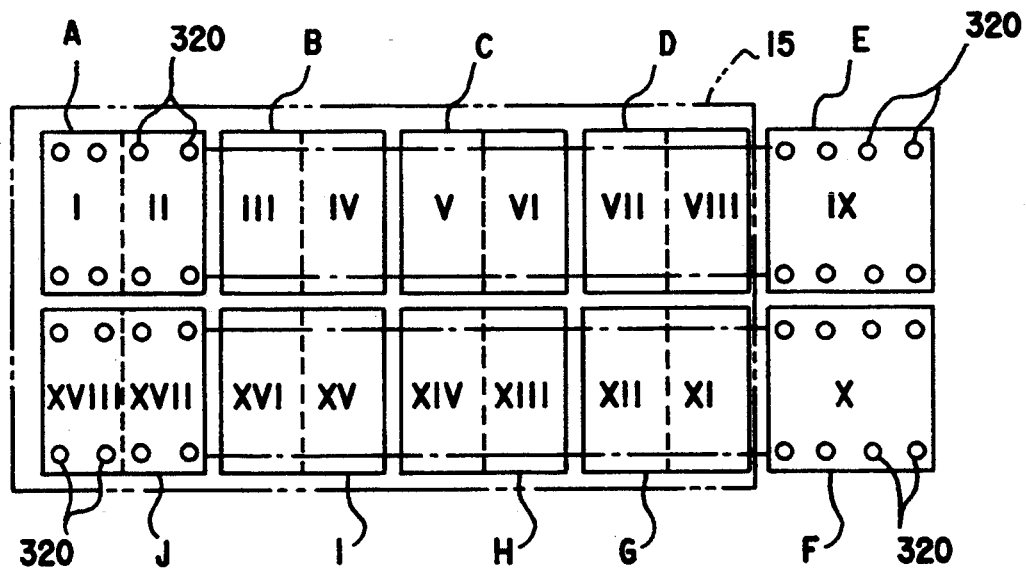
FIG. 13 is a schematic bottom view showing the configuration of suction members as suction means for composing a part of transfer and stacking means.
Figure 14:
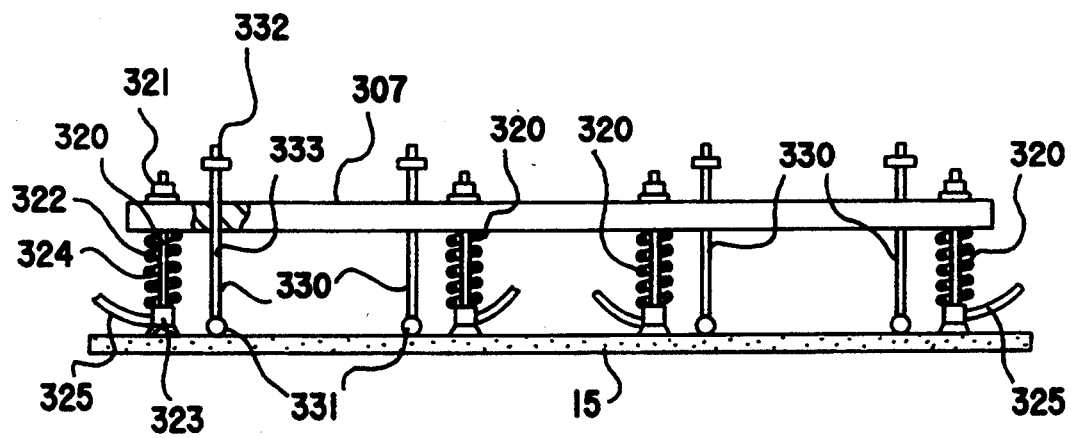
FIG. 14 is a schematic front view showing the state of sucking the segment by suction means.
Figure 15:
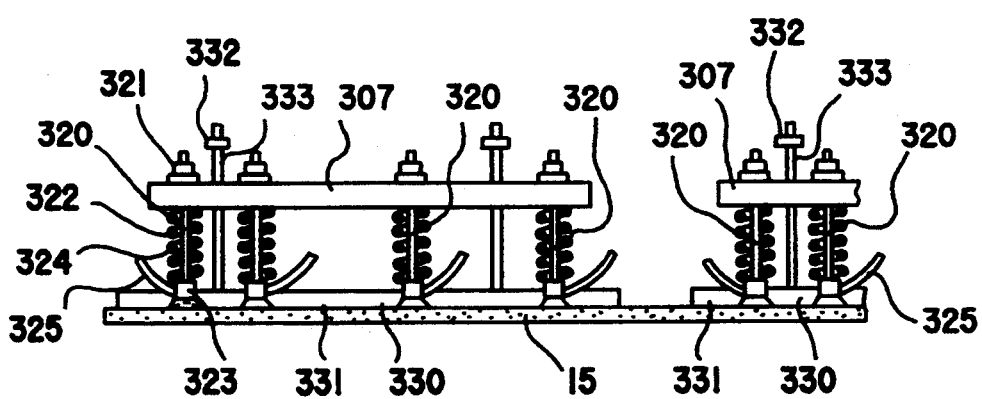
FIG. 15 is a schematic side view showing the state of sucking the segment by suction means.

The suction members 320 are disposed, for example, as eight pieces in each block divided in ten groups A to J as shown in FIG. 13, totaling to 80 pieces. These suction members 320 are composed of, as shown in FIG. 14 and FIG. 15, rods 322 held on the holding member 307 slidably in the vertical direction with stoppers 321 disposed at the upper end portions, suction parts 323 linked to the lower ends of the rods 322, and springs 324 applied on the peripheral surface of the rods 322.

Each suction part 323 is individually connected with a hose 325 communicating with the suction device not shown, and the air is sucked in through each suction part 323. This suction device is designed to supply compressed air to each suction part 323 from the suction device side by changing over.

The spring 324 is for absorbing the shock when the suction part 323 abuts against the segment 14 when sucking the segment 15 of the SMC.

The suction members 320 disposed in blocks A to J are further divided into zones I to XVIII as shown in FIG. 13, and these suction members 320 are controlled in communication with the suction device in each one of zones I to XVIII by switching valve or the like, depending on the size of the segment 15 of SMC sent onto the cut sheet conveyor 200 by the control device 700, and suction operation and stopping of operation can be effected in each one of the zones I to XVIII.

The thrusting member 330 is composed of two parallel bar-shaped spindles 331 in each one of blocks A to J, and rod 333 having a stopper 332 disposed at the upper end for holding the spindles 331 free to slide in the vertical direction on the holding member 307.

The spindle 331 is disposed lower than the suction part 323 in usual state as shown in FIG. 16, and when the segment 15 of the SMC is sucked by the suction part 323, it is moved upward while abutting against the upper surface of the segment 15 of the SMC as shown in FIG. 14 and FIG. 15. As a result, the segment 15 is thrust downward (in the direction departing from the suction part 323) by the gravity of the spindle part 331. The thrusting force of the thrusting member 330, that is, the weight of the spindle part 331 is set in consideration of the suction of the suction member 320 to the SMC 10, or the adhesiveness of the SMC 10, or the like.

The stacking truck 400 is explained below.

The stacking truck 400 composes a part of the transfer and stacking means of the invention, and communicates with the suction transfer device 300 as described below to receive the segment 15 of SMC above the weighing scale 500, stacks up the segments 15 thereon, and convey the segments 15 in stacked state after weighing of the segments 14 by the weighing scale 500 to the position where the charging machine 600 is waiting from above the weighing scale 500.

The stacking truck 400 comprises a conveying frame 403 slidably fitted over a pair of guide rails 402, 402 extended in the longitudinal direction of the fixed frame 401, and a conveying table 420 free to ascend and descend on the conveying frame 403. Between the fixed frame 401 and conveying frame 403, there is a conveying mechanism 410 composed of chain sprocket, and lift cylinders 405, 405 are set up before and after the conveying frame 403.

Figure 18:
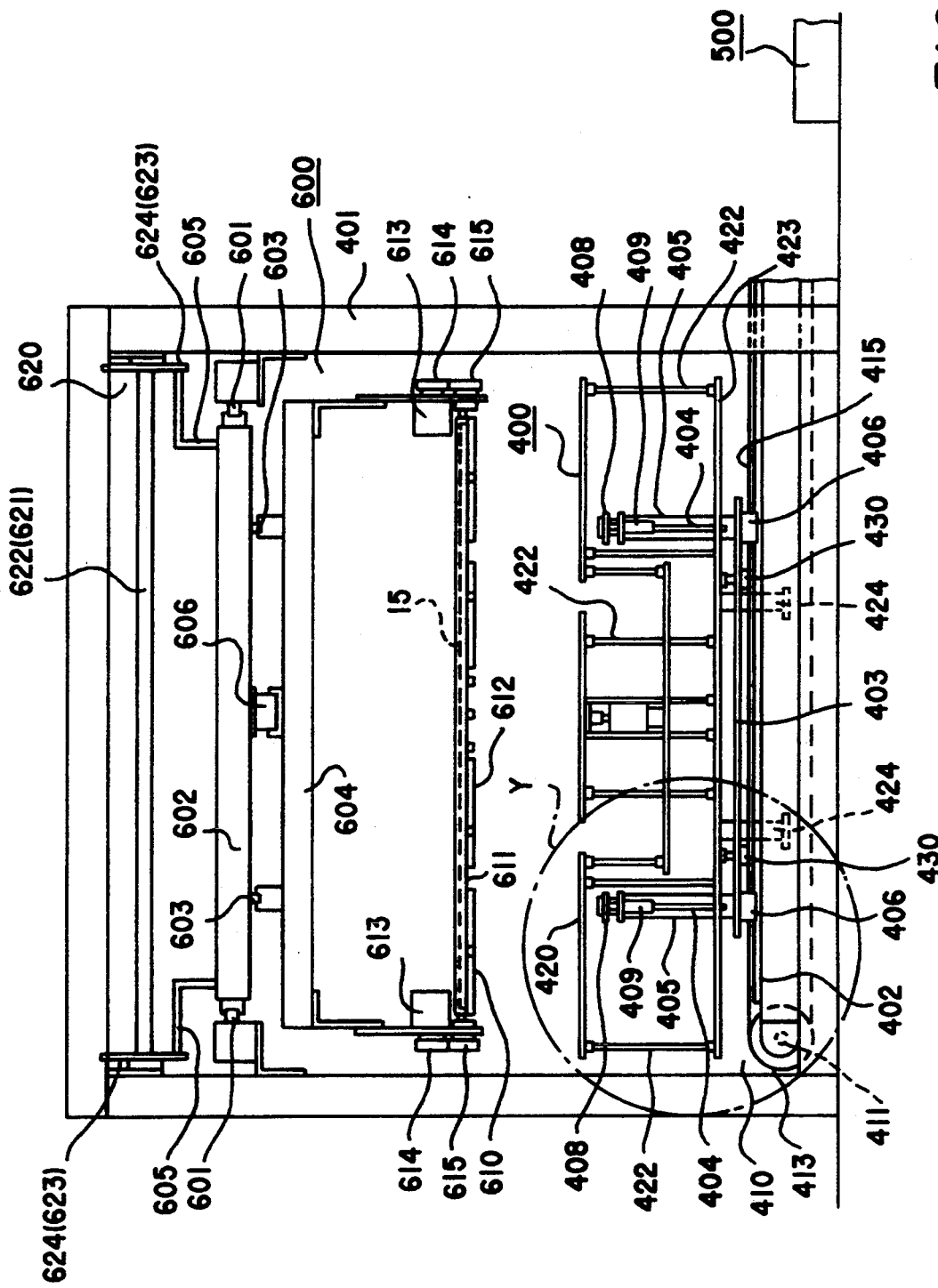
FIG. 18 is a side view showing a part of transfer and stacking means, a part of weighing means, and segment charging means.

The conveying mechanism 410 comprises a pair of sprockets 413, 414 respectively fixed to rotary shafts 411, 412 rotatably pivoted before and after the fixed frame 401 (in FIG. 18, one rotary shaft 412 and one sprocket 414 are omitted), and a pair of endless chains 415 suspended around front and rear sprockets 413, 414, and the conveying frame is coupled to the endless chain 415 through a coupling tool 406. Therefore, by rotating and driving the motor, not shown, mounted on the fixed frame 401, the endless chains 415 due to rotation of the sprockets 413, 414, the conveying frame 403, which is linked to the endless chains 415, may be moved reciprocally along the guide rail 402.

Moreover, at the front end of the piston rod 407 of the lift cylinder 405 set up on the conveying frame 403, a support member 408 is disposed as shown in FIG. 19, and this support member 408 is disposed so as to be remote, without contacting with, from the conveying table 420 when the lift cylinder 405 is in the contraction position. The support member 408 is coupled with the guide rod 404 inserted slidably in a pair of linear bearings 409, 409 disposed at both sides of the lift cylinder 405, thereby guiding the elevation and lowering of the support member 408 due to expansion and contraction actions of the lift cylinder 405. Accordingly, when the lift cylinder 405 is extended, the support member 408 is guided by the linear bearing 409 to go up, and abuts against the conveying table 420 and lifts it up, so that the conveying table 420 may be raised.

On the other hand, the conveying table 420 comprises, as shown in FIG. 19 and FIG. 20, a plurality of plates 421 disposed at specific intervals corresponding to the shape of the arm member 612 of the charging machine 600 described later, preferably with protrusions projecting upward on the upper surface, a multiplicity of pipes 422 coupled to the lower surfaces of these plates 421, and a table frame 423 for coupling the lower ends of these pipes 422, and when the arm member 612 rotates, it is .formed so that the arm member 612 may pass across the conveying table 420 without interference. In FIG. 20, in order to clarify the shape of the conveying table 420, the conveying table 420 is indicated by hatching. In the lower part of the table frame 423, a support piece 424 is suspended, and as mentioned later while the weighing cylinder 430 is supporting the conveying table 420 by extending the lower end of the support piece 424 is spaced a slight distance without contacting with the weighing scale 500.

The conveying frame 403 further comprises the weighing cylinder 430 at both sides before and after its and its piston rod 431 is detachable from the table frame 423 of the conveying table 420. In this case, there is a relation of x>y>z among the distance x between the conveying table 420 and support member 408 coupled to the lift cylinder 405 in contracted states the telescopic stroke y of the weighing cylinder 430, and the distance z between the lower end of the support piece 424 and the weighing scale 500.

Therefore, when the weighing cylinder 430 is contracted, the piston rod 431 of the weighing cylinder 430 is released from the table frame 423 of the conveying table 420 while contracting for the stroke y, and the conveying table 420 is mounted on the measuring scale 500 through its support piece 424. At this time, the conveying table 420 does not contact with the support member 408 disposed on the piston rod 407 of the lift cylinder 405, and only the weight of the conveying table 420 can be measured. Hence, by calculating the weight of the conveying table 420 and the weight of the conveying table 420 in the stacked state of segments 14 of SMC 10, the total weight of segments 15 is determined.

In this case, since the mounting surface of the segments 15 of the conveying table 420 is formed by linking a plurality of plates 421 at specific intervals, the segments 15 can be mounted in a small contact area, and the deposit of resin paste of SMC 10 may be minimized.

The charging machine 600 is described in detail below.

The charging machine 600 composes the segment charging means of the invention, and is designed to charge the segments 14 in stacked state conveyed from the weighing scale 500 through the stacking truck 400 in batch onto the forming die 21 of the press machine 20.

The charging machine 600 comprises a fixed frame 401, a moving frame 602 slidably inserted into a pair of guide rails 601, 601 (see FIG. 18) extended in the widthwise direction (the lateral direction in FIG. 21) of the fixed frame 401, a charging frame 604 slidably inserted in a pair of guide rails 603, 603 extended in the widthwise direction of the moving frame 602, and a pair of charging arms 610, 610 rotatably disposed on the charging frame 604. Between the fixed frame 401 and moving frame 602, a moving mechanism 620 composed of chain sprocket is disposed, and a rodless cylinder 606 is disposed between the moving frame 602 and charging frame 604.

The moving mechanism 620 comprises sprockets 623, 624 fixed in pair each to rotary shafts 621, 622 rotatably pivoted on right and left sides of the fixed frame 401, and a pair of endless chains 625, 625 wound around these sprockets 623, 624, and the moving frame 602 is coupled to the endless chains 625 through a coupling tool 605. Therefore, by rotating and driving the motor 607 disposed in the fixed frame 401, the endless chain 625 moves by the rotation of the sprocket 624, and the moving frame 602 coupled to the endless chains 625 is moved reciprocally along the guide rail 601.

Besides, since the piston 608 of the rodless cylinder 606 is fixed to the charging frame 604, by expanding and contracting the rodless cylinder 606, the charging frame 604 is moved reciprocally along the guide rail 603 against the moving frame 602.

Figure 21:
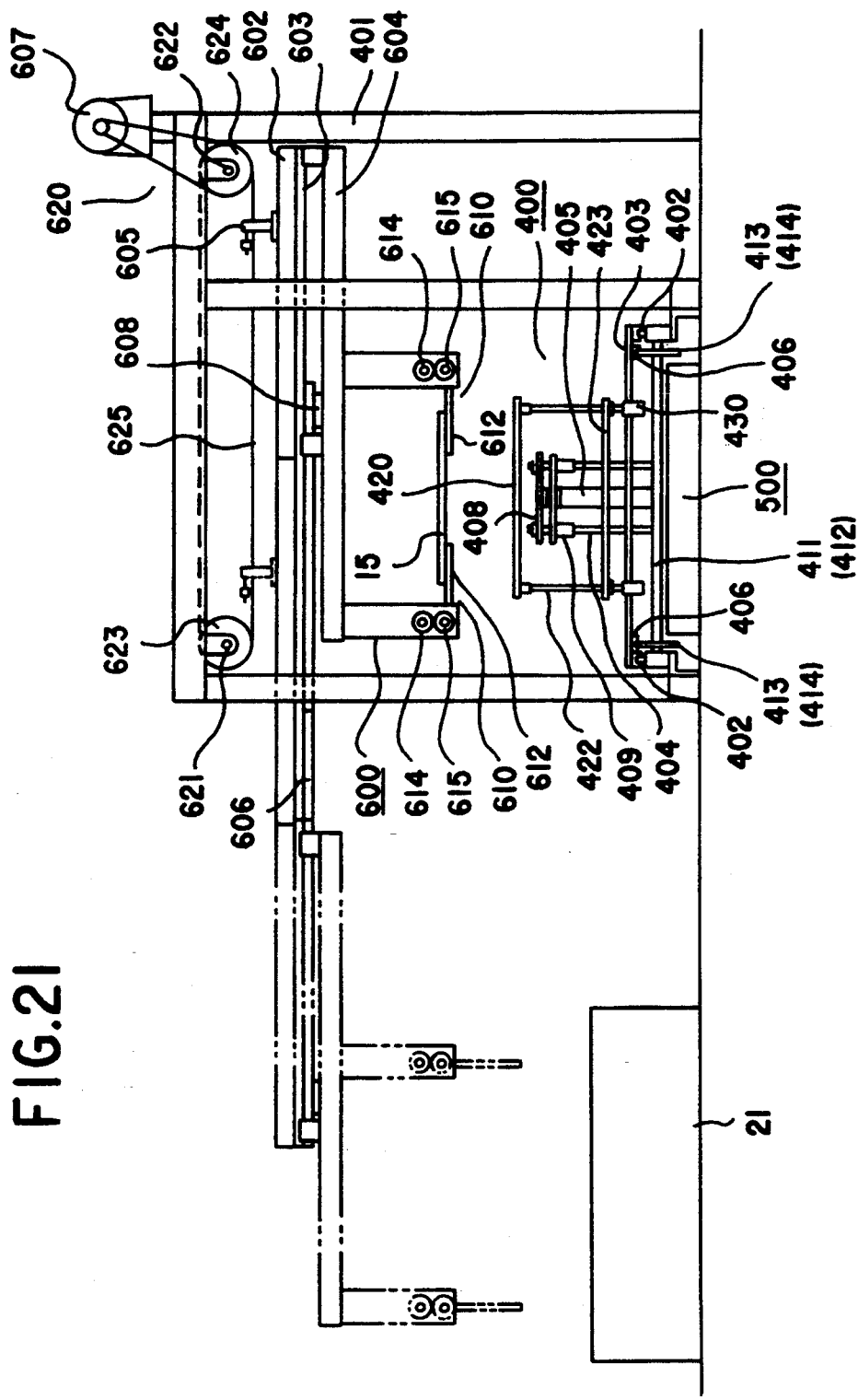
FIG. 21 is a schematic front view showing the constitution of segment charging means together with segment receiving means.

Thus, by moving the moving frame 602 against the fixed frame 401 and moving the charging frame 604 against the moving frame 602, reciprocal motions are realized between the state indicated by solid line and the state indicated by chain line in FIG. 21.

Figure 22:
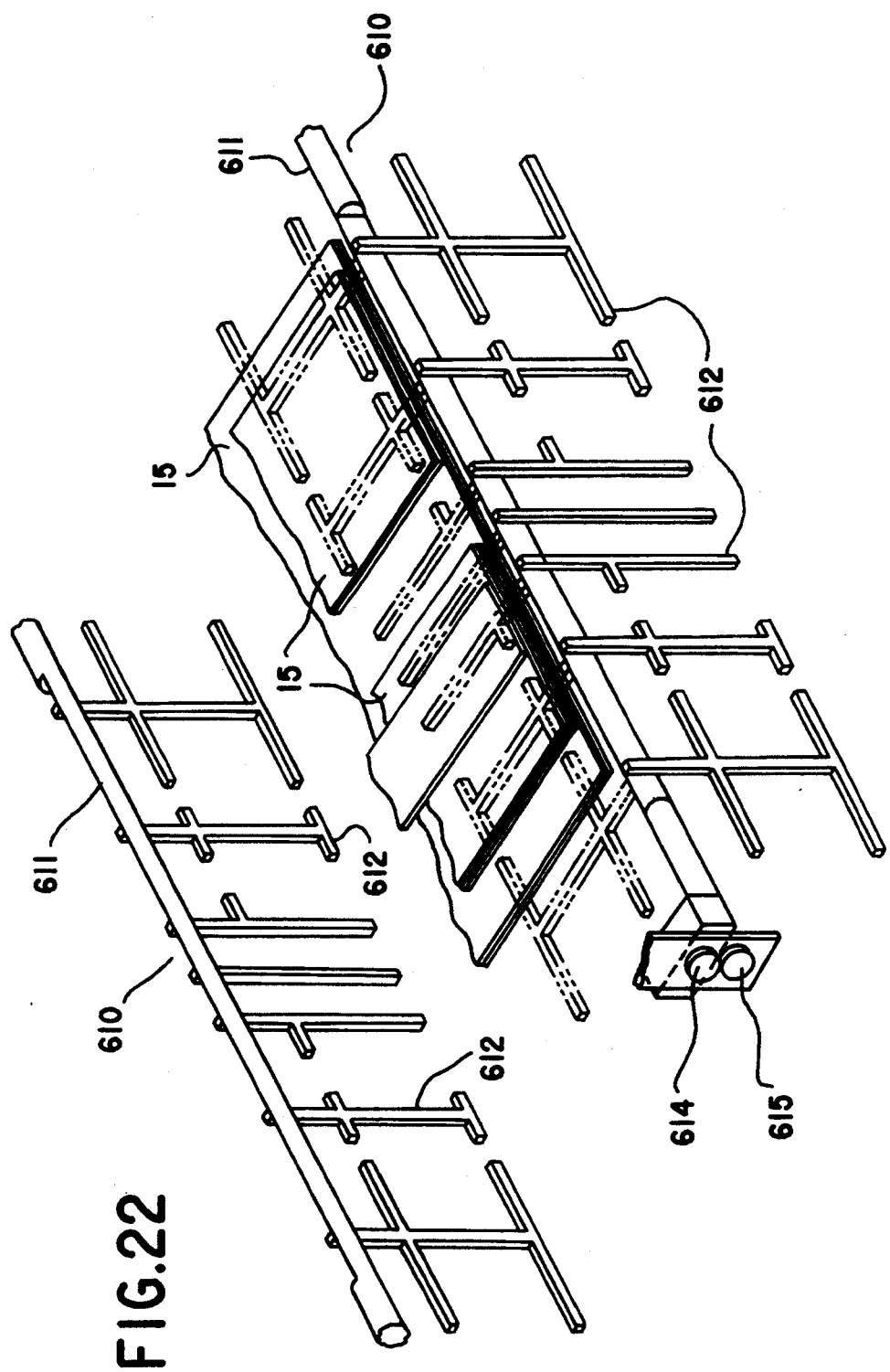
FIG. 22 is a perspective view showing the relation of charging arm for composing the segment charging means and segment.

Incidentally, a pair of charging arms 610, 610 disposed in the charging frame 604 comprises, as the detail is shown in FIG. 22, a turning shaft 611 rotatably pivoted as being extended in the longitudinal direction (the lateral direction in FIG. 18) of the charging frame 604, a multiplicity of arm members 612 formed in bar or I-shape as being linked at specific intervals on the turning shaft 611, and a torque actuator (see FIG. 18) as the driving device of the turning shaft 611 as being disposed on the charging frame 604, and is formed so as not to interfere with the conveying table of the stacking truck 400 when the arm members 612 turn. A driving gear 614 is attached to the output shaft of the torque actuator 613, and a driven gear 615 is disposed on the turning shaft 611, and the driving gear 614 and driven gear 615 are engaged with each other. Therefore, by driving the torque actuator 613, the right and left charging arms 610, 610 can circulate between the state of the arm members 612, 612 drooping in the vertical direction (the solid line state in FIG. 22), and the state of mutually turning 90 degrees reversely so that the front ends of the arm members 612, 612 confront each other (the chain line state in FIG. 22).

As a result, the charging arm 610 can scoop up the segments 15 of SMC stacked up on the center of the conveying table 420 of the stacking truck 400 from the conveying table 420 in a small contact area.

Figure 23:
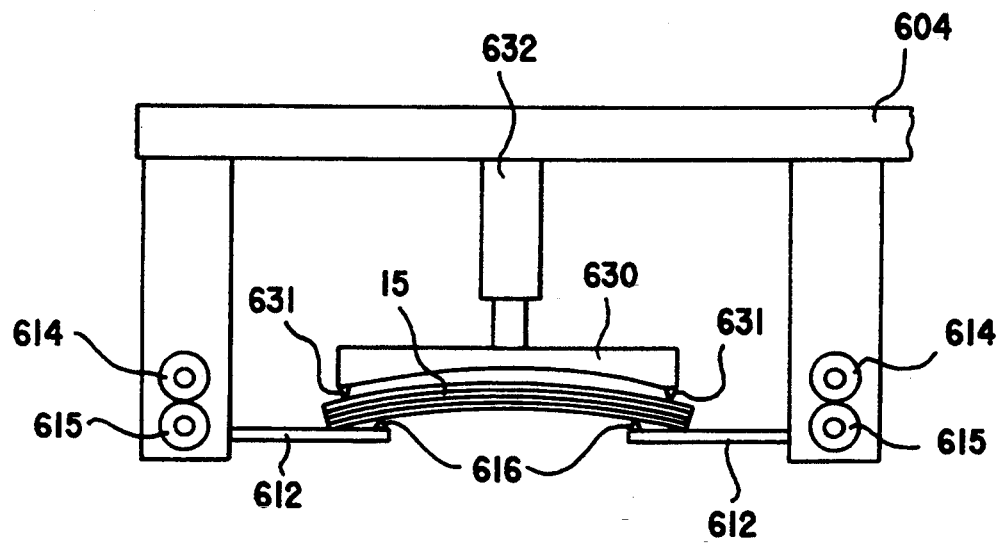
FIG. 23 is a schematic front view showing the constitution of deflection preventive means in the segment charging means.

Besides, since the SMC 10 is semi-cured and flexible, the segment 15 may deflect by gravity between the both ends of the arm members 612 when conveying the segment 15 by the charging machine 600. In this case, as shown in FIG. 23, by fitting a deflection preventive member 630 forming protrusions 631, 631 on both sides to the charging frame 604 through a telescopic cylinder 632, forming a protrusion 616 to the front end of the arm member 612, and inserting the segment 15 scooped up by the arm member 612 by positioning the protrusion 631 of the deflection preventive member 630 outward of the protrusion 616 of the arm member 612 by extending the telescopic cylinder 632, deflection is prevented by applying a tensile force to the segment 15. When putting the segment 15 into the forming die 21 by turning the arm member 612, this deflection preventive member 630 is lowered by the telescopic cylinder 632, and a downward force is applied to the segment 15, so that charging into the forming die 21 will be more accurate.

In this embodiment, only one set of charging arms was used in the charging frame, but another set of charging arms may be also disposed. That is, the second charging arms are disposed so that the turning shaft may be orthogonal to the turning shaft of the first charging arms and be located between the first charging arms, and it may be particularly useful for scooping up the small segment 15. When disposing such second charging arms, since they are different by 90 degrees from the direction of scooping up the segment by the first charging arms, the conveying table must be formed so as not to interfere with the arm members when the arm members forming the second charging arms rotate, and it is also necessary to rotate by 90 degrees. In this case, only a part of the conveying table, such as the middle part only, may be rotated 90 degrees.

The operation of thus composed automatic feeder is explained below. In this explanation, mainly, segments 15 of SMC in the state cut in an arbitrary length with the width unchanged are transferred onto the sheet cutter conveyor 200, and these segments 14 are stacked up on the stacking truck 400, and are charged into the forming die 21 of the press machine 20.

First, in the sheet cutter 100, the SMC sheet 12 is let off from the roll 13 by the pinch rolls 102, 102, and the parting films 11, 11 are separated from both sides of the SMC sheet 12 by the parting members 109, 109. The separated parting films 11, 11 are taken up on the take-up rolls 103, 103. The SMC 10 cleared from the parting films 11, 11 is sequentially cut in specific length by the lateral cutting blade 104. At this time, the cutting length of the SMC 10 is measured by the encoder connected to the pinch roll 102, and on the basis of the result of measurement, the control device 700 controls the action timing of the lateral cutting blade 104.

The SMC 10 cut by the lateral cutting blade 104 is a segment 14, which is sent out from the sheet cutter 100, and is sequentially received by the sheet cutter conveyor 200, and conveyed to the specified position on the sheet cutter conveyor 200. When the segment 15 reaches the specified position of the sheet cutter conveyor 200, it is detected by the sensor, and the control device 700 stops driving of the sheet cutter conveyor 200 on the basis of this detection signal.

When the segment 15 is put on the specified position on the sheet cutter conveyor 200 in this way, the control device 700 actuates the suction and transfer device 300 to transfer the segment 15. More specifically, the lift cylinder 304 is extended to lower the suction member 320, and the suction unit 323 of the suction member 320 abuts against the segment 15. Afterwards, manipulating the suction device, the suction unit 323 is sucked, and this suction unit 323 sucks the segment 15.

At this time of suction, each suction member 320 is controlled in action according to zones I to XVIII depending on the area of the segment 15 by the control device 700. For example, if the size of the segment 15 corresponds to blocks A to D, G to J as indicated by double dot chain line in FIG. 13, the suction members 320 of zones I to VIII, XI to XVIII communicate with the suction device, while communication between the suction members 320 of zones IX, X and the suction device is cut off, by controlling the control valves.

Subsequently, the lift cylinder 304 is contracted to lift the segment 15 upward. In the segment 15 sucking state by the suction member 320, the spindle 331 abuts against the upper surface of the segment 15 as shown in FIG. 14 and FIG. 15, and the segment 15 is released by gravity from the suction part 323, and is thrust downward.

When the segment 15 is lifted up by the suction member 320, the driving motor 315 is driven to move the traveling frame 303, and the segment 15 is put above the stacking truck 500 waiting at the position of the weighing scale 500. At this time, in the control device 700, the movement of the traveling frame 303 is controlled so that the center of sucked segment 15 in the widthwise direction may coincide with the center of the conveying table 420 of the stacking truck 400, and the movement of the stacking truck 400 is also controlled so that the center of the conveying table 420 may be located in the center of the arbitrarily cut segment 15 in the lengthwise direction.

Later, by stopping the suction action by the suction device, and at the same time the suction device is changed over to feed compressed air into the suction parts 323. Consequently, together with the thrusting force of the spindle 331 acting on the segment 15, the segment 15 is released from the suction parts 323, and is put on the conveying table 420 of the stacking truck 400.

By thrusting the segment 15 sucked to the suction members 320 in the releasing direction by the spindle 331, deviation of timing of the segment 15 dislocating from the suction members 320 due to adhesiveness of the SMC 10 may be eliminated, and the segments 15 are stacked up precisely on the conveying table 420 of the stacking truck 400.

Thus, by repeating such action, a specified number of segments 15 may be automatically stacked up on the stacking truck 400 without any manual help.

Here, if the SMC 10 is cut laterally and longitudinally by the lateral cutting and longitudinal cutting blades 104, 105 (for example, cut in ten pieces laterally and longitudinally as corresponding to blocks A to J of the suction and transfer device 300), they are stacked up on the stacking truck 400 in the following procedure.

The segments 15 of SMC cut in ten pieces laterally and longitudinally are conveyed by the sheet cutter conveyor 200, and sent up to the specified position on the sheet cutter conveyor 200. When the segments 15 reach the specified position of the sheet cutter conveyor 200, it is detected by the sensor, and the control device 700 stops the driving of the sheet cutter conveyor 200 on the basis of this detection signal.

In this way, when the segments 15 are put on specified position on the sheet cutter conveyor 200, the control device 700 actuates the suction and transfer device 300 to transfer the segments 15. More specifically, first the lift cylinder 304 is extended to lover the suction member 320, and the suction part 323 of the suction member 320 abuts against the segment 15. Later, by actuating the suction device to suck the suction part 323, the segment 15 is sucked to the suction part 323.

At this time of suction, each suction member 320 is controlled by the control device 700 in the suction action in each zone of I to XVIII depending on the number of segments 15 put on the sheet cutter conveyor 20.

Then the lift cylinder 304 is contracted to lift all segments 15 upward. In this way, in the state of sucking the segments 15 by the suction member 320, the spindle 321 abuts against the upper surface of the segment 15, thereby thrusting the segment 15 by gravity downward so as to be dislocated from the suction part 323.

Figure 17:
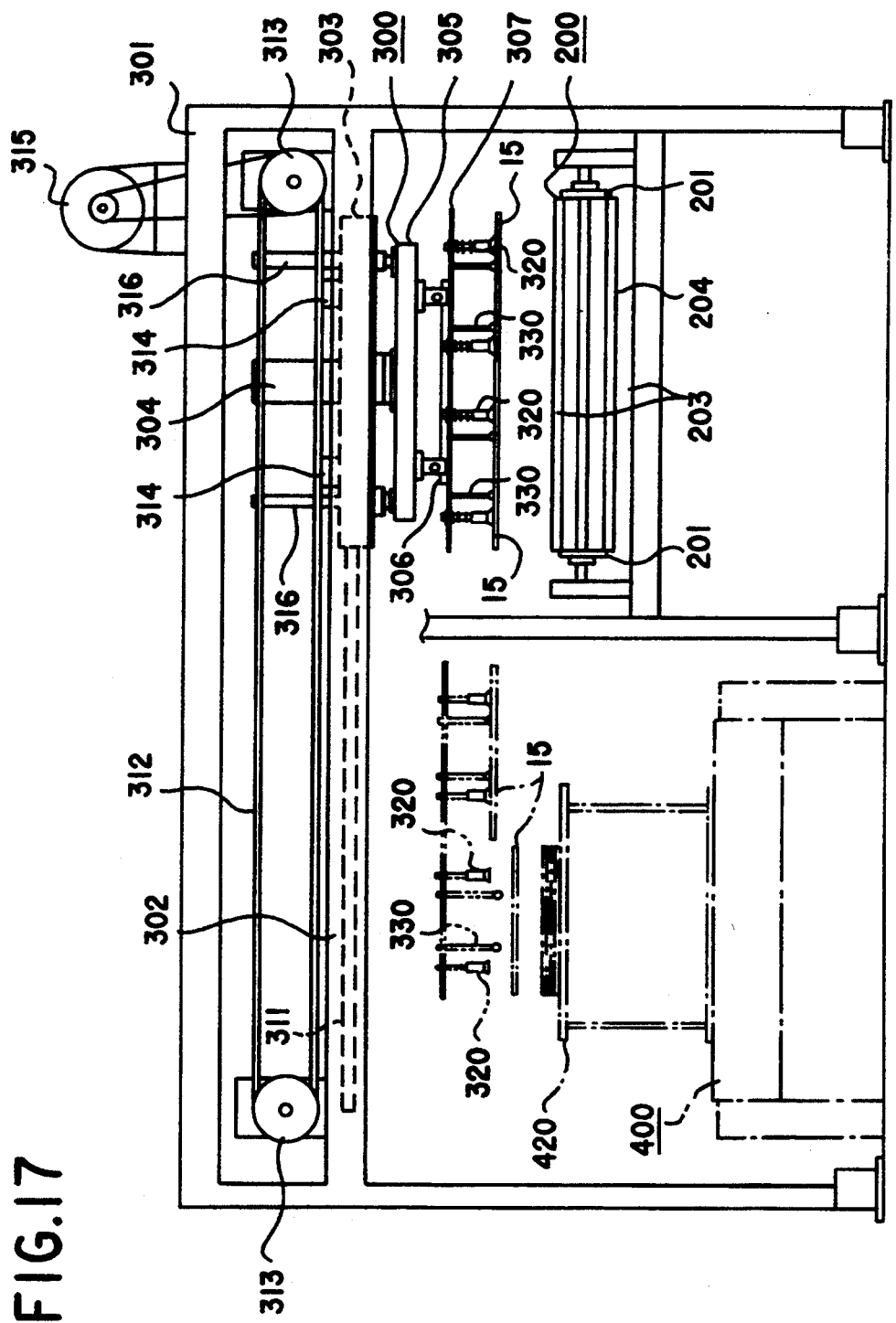
FIG. 17 is a schematic front view for explaining the operation of transfer and stacking means.

When all segments 15 are lifted up by the suction members 320, the driving motor 315 is driven to move the traveling frame 303, and the segments 15 in the left side row are put above the stacking truck 400 as indicated by double dot chain line in FIG. 17. At this time, the control device 700 controls the movement of the traveling frame 303 so that the center of the segments 15 in the left side row in the widthwise direction may coincide with the center of the conveying table 420 of the stacking truck 400, while the movement of the stacking truck 400 is controlled so that the center of the conveying table 420 may come to the center of the segment 15 sucked in block A in the lengthwise direction.

Consequently, the suction action of the suction members 320 in block A is stopped, and at the same time the suction device is changed over to feed compressed air into the suction members 320. As a result, the segments 15 sucked to the suction members 320 in block A are released from the suction part 323, together with the thrusting force of the spindle 331 acting on the segments 15, and are put on the conveying table 420 of the stacking truck 400.

Later, the conveying table 420 of the stacking truck 400 is over beneath the segments 15 sucked to the suction members 320 in block B, and similarly these segments 15 are released and put on the segments 15 already placed on the conveying table 420 of the stacking truck 400. Sequentially below blocks C, D, E, the stacking truck 400 is moved, and the segments 15 are sequentially stacked up on the conveying table 420. In this way, when the segments 15 sucked in blocks A to E are stacked up on the conveying table 420, this time, the traveling frame 303 is moved to the left in FIG. 17, and arranged so that the center of the segments 15 in the right side row in the widthwise direction may coincide with the center of the conveying table 420, and likewise the segments 15 sucked to the suction members of blocks F to J are sequentially stacked up in the order of blocks F to J on the conveying table 420. In this way, the segments 15 are stacked up in the sequence of blocks A to J from the bottom, on the conveying table 420 of the stacking truck 400.

In this may, by moving the suction and transfer device 300 and stacking truck 400 mutually in the orthogonal directions, the segments 15 are stacked up on the stacking truck 400, or, otherwise, by moving the suction and transfer device 300 freely on the horizontal plane, the segments 15 may be stacked up on the stacking truck 400 only by the movement by the suction and transfer device 300. Or by moving the stacking truck 400 freely on the horizontal plane, the segments 15 may be stacked up on the stacking truck 400 by the movement of the stacking truck 400. That is, the moving direction of the suction and transfer device 300 and stacking truck 400 is not limited, and anyway the segments 15 sucked by the suction and transfer device 300 are stacked up on the stacking truck 400.

During the stacking step, the weighing cylinder 430 is extended, and the conveying table 420 is raised and is separated from the weighing scale 500. Therefore, while the segments 15 are stacked up on the conveying table 420, the impact will not propagate to the weighing scale 500.

Figure 24:
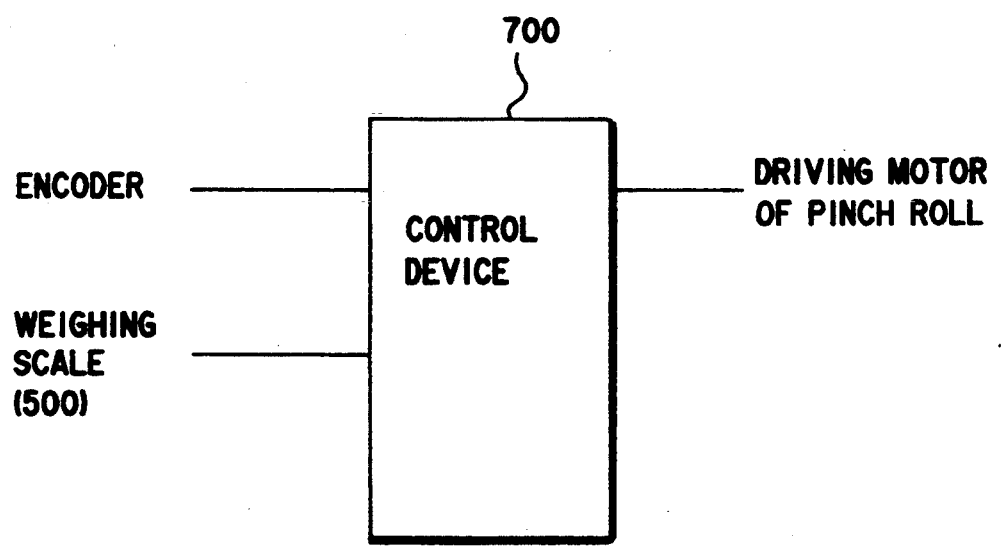
FIG. 24 is a block diagram showing input and output of signals in refilling means.
Figure 26:
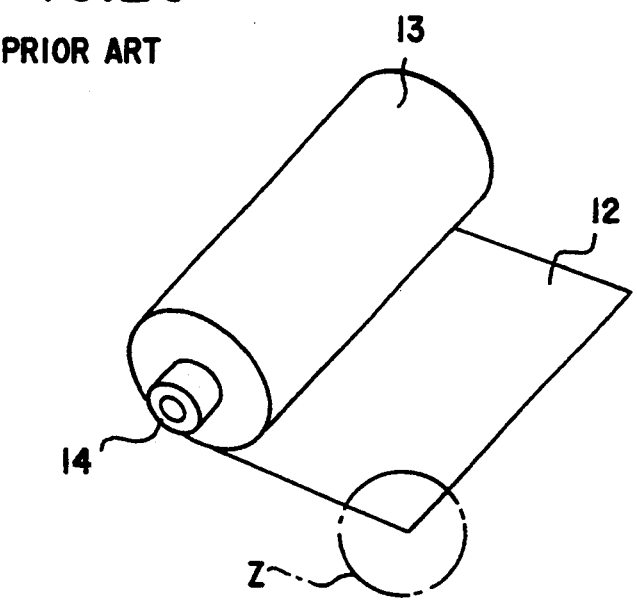
FIG. 26 is a perspective view shoving the roll of adhesive sheet material (SMC)
Figure 27:
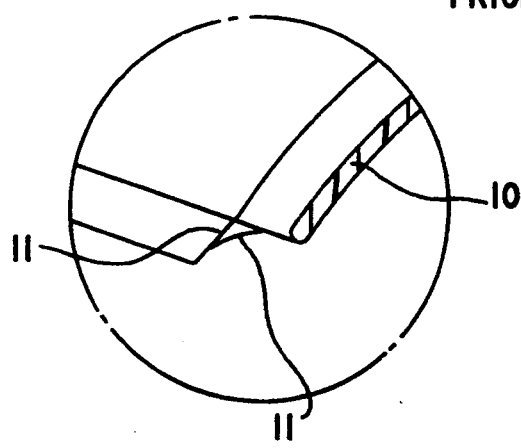
FIG. 27 is a magnified view of part Z in FIG. 26.
Figure 25:
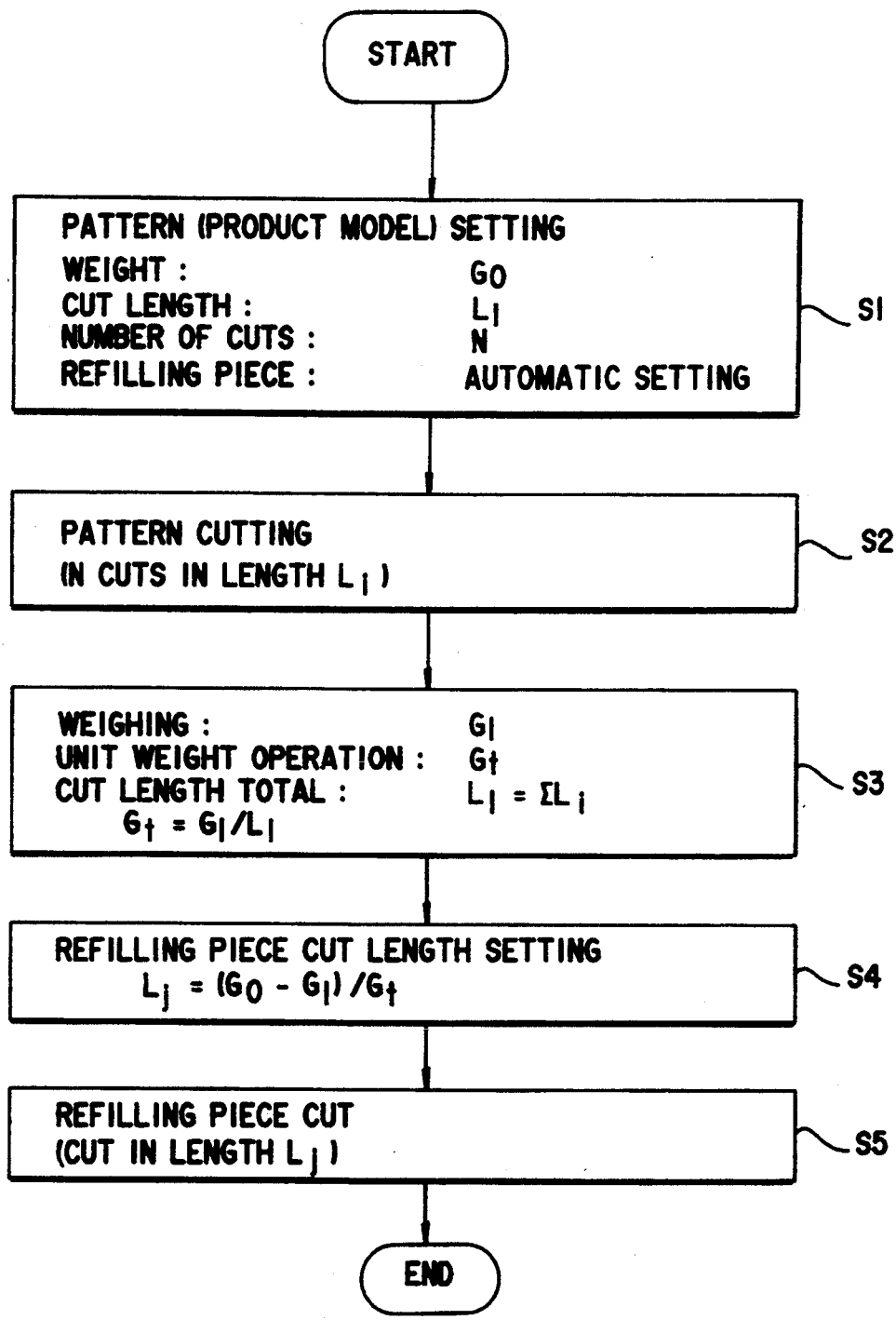
FIG. 25 is a flow chart showing the operation of the refilling means.
Figure 28:
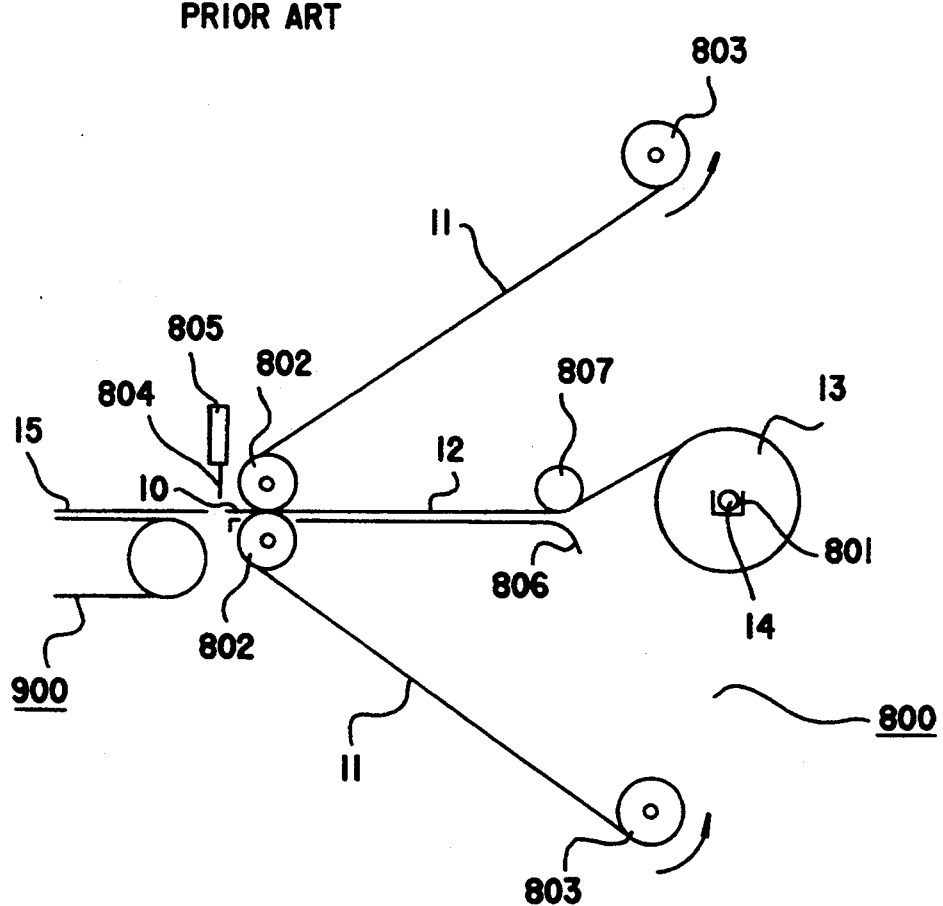
FIG. 28 is a schematic side view showing a conventional sheet cutter.

When stacking of the segments 15 is over, the weighing cylinder 430 is contracted, and the weight of the conveying table 420 mounting the segments 15 is measured. The weighing method is explained below while referring to FIG. 24 and FIG. 25.

The revolution count signal of the pinch roll 102 detected by the encoder of the sheet cutter 100 and the weight signal of the segment 14 detected by the weighing scale 500 are sent to the control device 700, and the control device 700 processes these signals, and controls the drive motor of the pinch roll 102 of the sheet cutter 100.

When the program is started in the control device 700, first the pattern (product model) is set at step S1. That is, of the weight $G_0$ required for forming one product, about 95% is satisfied by setting the cut length Li and number of cuts N, and the weight portion corresponding to the remaining about 5% is set automatically as refill pieces. In this case, the cut length Li and number of cuts N corresponding to the type or product model are included in the database, and by entering the type, the corresponding cut length Li and number of cuts N are set automatically.

Next, at step S2, the length of the SMC 10 let off by the pinch rolls 102, 102 of the sheet cutter 100 is measured by the encoder, and when reaching the preset length Li, the lateral cutting blade 104 moves reciprocally to cut off the SMC 10, and the segment 15 of specified length is sent into the sheet cutter conveyor 200. The segment 15 conveyed to the specified position of the sheet cutter conveyed 200 is further conveyor to the stacking truck 400 waiting on the weighing scale 500 by means of the suction and transfer device 300 as mentioned above.

Meanwhile, since the job for cutting the SMC 10 to the specified length Li by the sheet cutter 100 and the job of conveying the segment 15 to the specified position by the sheet cutter conveyor 200, and the job of stacking up the segments 15 on the weighing scale 500 by the suction and transfer device 300 are independent from each other, and therefore while the suction and transfer device 300 is moving in order to stack up the segments 15 on the weighing scale 500, it is possible to cut the SMC 10 to specified length by the sheet cutter 100 and convey the segment 15 to the specified position by the sheet cutter conveyor 200, without interrupting the cutting and conveying job to have waiting time, so that the entire production efficiency is enhanced.

In this way, when the segments 15 in the specified length Li are cut out by N pieces and stacked up on the weighing scale 500, they are weighed (step S3). From the determined weight $G_1$ and total length $L_1$ of segments 15, the weight per unit length Gt is calculated by $G_1/L_1$. Furthermore, when the weight per unit length Gt is calculated, at step S4, the cutting length Lj of the final segment 15 as the refill piece is calculated by $(G_0-G_1)/Gt$.

Next, at step S5, the calculated final cutting length Lj is let off by the pinch rolls 102, 102, and when it is detected by the encoder, the SMC 10 is cut in that length, and is conveyed by the sheet cutter conveyor 200. The conveyed final segment 15 is put and stacked up on the segments 15 stacked up already on the stacking truck 400 by the suction and transfer device 300. All the stacked segments 15 are charged into the forming die by the charging machine 600.

In this weighing method, the weighing error by the weighing scale 500 is not accumulated because the measurement takes place once only, but since the cutting length of the SMC 10 is measured by using the encoder of the sheet cutter 100, a measuring error is involved due to starting and stopping or slipping between the pinch rolls 102 and SMC 10 (the parting films 11).

This measuring error is discussed; supposing the measuring error due to pinch rolls 102 and SMC 10 to be $\alpha$, the product set weight to be $G_0$, the measured weight to be $G_1$, and the length of the SMC 10 sent up to the time of weighing (machine recognition length) to be $L_1$, it follows that:

Weight per unit length calculated from weighing (unit weight of machine recognition): $G_1/L_1$ Actual feed length up to weighing: $(1-\alpha)L_1$ True weight per unit length: $G_1/(1-\alpha)L_1$ Required weight of refill piece: $G_0-G_1$ As a result, Cutting command length of refill piece: $(G_0-G_1)/(G_1/L_1)$ Actual length of refill piece: $(1-\alpha)(G_0-G_1)/(G_1/L_1)$ Hence, since the actual refill piece weight is expressed by the product of the actual length of refill piece and true weight per unit length, the actual refill weight is $$(1-\alpha)(G_0-G_1)/(G_1/L_1) \times G_1/(1-\alpha)L_1 = G_0-G_1$$

Thus, as far as the measuring error including the slip rate is constant, the measuring error can be completely ignored by feeding back the weight per unit length containing this error, and using it in calculation of the cutting length of the refill piece, and the weight is adjusted very precisely.

In this way, when the measurement of gross weight of the segments 15 is over, the stacking truck 400 is moved to the waiting position of the charging machine 600. That is, by driving the transfer mechanism 410, the conveying frame 403 linked to the endless chain 415 composing the transfer mechanism 410 is moved backward along the guide rail 402. When the stacking truck 400 reaches the set position immediately beneath the space enclosed by a pair of arm members 612, 612 in drooped state, the operation of the conveying mechanism 410 is stopped.

In succession, the lift cylinder 405 is extended, and the support member 408 linked to its piston rod 407 is raised while supporting the conveying table 420. When the lift cylinder 405 reaches the stroke end, the conveying table 420 and the segments 15 stacked up thereon are nearly at the same height as the turning shaft 611 of the charging arm 610. In this state, the torque actuator 613 is driven so that the front ends of the arm members 612, 612 may confront each other, and the turning shafts 611, 611 of the charging arm 610 are turned 90 degrees in mutually opposite directions, so that the plurality of arm member 612 scoop up and support the stacked segments 15 in batch, without interfering with the conveying table 420.

Later, the lift cylinder 405 is contracted and the conveying mechanism 410 is driven at the same time to return the stacking truck 400 onto the weighing scale 500 to be ready for stacking of new segments 15.

On the other hand, the segments 15 scooped up from the conveying table 420 by the turning motion of the charging arm 610 are moved to the position immediately beneath the forming die 21 by driving the moving mechanism 620 and extending the rodless cylinder 606 at the same time. That is, by driving the moving mechanism 620, the moving frame 602 linked to the endless chain 625 for composing the moving mechanism 620 is moved in the widthwise direction along the guide rail 603, and the charging frame 604 linked with the piston 608 of the rodless cylinder 606 is moved in the widthwise direction along the guide rail 603 to the moving frame 602.

When the charging arms 610, 610 reach the position immediately beneath the forming die 21, the operation of the moving mechanism 620 and rodless cylinder 606 is stopped, and the torque actuator 615 is driven in the reverse direction of the above so that the arm members 612, 612 may droop in the vertical direction, and the turning shafts 611, 611 of the charging arms 610, 610 are turned 90 degrees in the mutually opposite directions, and consequently the segments 15 supported by the arm members 612, 612 lose their support, and dropped into the specified position in the forming die 21 (the state of chain line in FIG. 21).

In this case, the arm members 6 12 composing the charging arm 610 are supporting the segments 15 in a small contact area, and although normal charging is not impeded due to adhesion of part with the arm members 612 due to adhesiveness at the time of charging, it is desired to turn the arm members 612 at higher speed.

In the foregoing embodiments, the SMC is used as the adhesive sheet material, but the adhesive sheet material is not limited to SMC only.

Industrial Applicability

As explained herein, the automatic feeder of adhesive sheet material of the invention is useful in the forming system using adhesive materials such as SMC, and it preferred in the field where automation has been difficult due to the adhesive property of the material.

What is claimed is:

1. An automatic feeder of adhesive sheet material for feeding a long adhesive sheet material having both sides protected with parting films into a forming machine in predetermined weight amounts, comprising:
   segment feeding means including means for separating films from both sides of the adhesive sheet material, means for cutting the adhesive sheet material cleared from the parting films into segments of specified size sequentially, and means for transferring the cut segments from said segment feeding means,
   conveying means for receiving the segments transferred from said segment feeding means and for conveying said segments to a specified position,
   transfer and stacking means for transferring a plurality of segments conveyed to the specified position by said conveying means to a preset segment weighing position remote from said conveying means, and stacking up a plurality of segments at the segment weighing position,
   weighing means installed at the segment weighing position for weighing the total weight of the segments stacked up by said transfer and stacking means,
   segment charging means for discharging the segments of specific weight in a stacked state after weighing by said weighing means in batch from the segment weighing position into the forming machine, and control means for controlling the operation of said segment feeding means, said conveying means, said transfer and stacking means and said segment charging means to deliver a predetermined weight of adhesive sheet material to said forming machine, said control means including controls for feeding additionally cut and fed segments to said segment charging means in response to a measured deficiency in segment weight measured by said weighing means.

2. An automatic feeder of adhesive sheet material of claim 1, wherein said segment feeding means further comprises parting means for separating the parting films from the adhesive sheet material by folding the parting films along the parting members, said parting means including a pair of pinch rolls for pinching the adhesive sheet material from above and below and letting off, and parting members disposed downstream of the pinch rolls and possessing at least in part an arc part of greater curvature than the curvature of the pinch rolls.

3. An automatic feeder of adhesive sheet material of claim 2, wherein said parting members are roll members.

4. An automatic feeder of adhesive sheet material of claim 2, wherein said parting members are scraper members.

5. An automatic feeder of adhesive sheet material of claim 2, wherein said parting means further comprises parting aid means for assisting the parting by said parting members by injecting compressed air between the adhesive sheet material and the parting films separated therefrom by said parting members.

6. An automatic feeder of adhesive sheet material of claim 1, wherein said transfer and stacking means further comprises suction means for transferring the plurality of segments conveyed to the specified position by said conveying means to the segment weighing position in batch, segment receiving means disposed movably at the segment weighing position, and wherein said control means includes means for controlling the operation of the suction means and the segment receiving means so that the segments may be sequentially separated individually from said suction means and neatly stacked upon said segment receiving means.

7. An automatic feeder of adhesive sheet material of claim 6, wherein said transfer and stacking means further comprises thrusting means for thrusting the segments sucked by said suction means in the parting direction.

8. An automatic feeder of adhesive sheet material for feeding a long adhesive sheet material having both sides protected with parting films into a forming machine in predetermined weight amounts comprising:
   segment feeding means including means for separating parting films from both sides of the adhesive sheet material, means for cutting the adhesive sheet material cleared from the parting films into segments of specified size sequentially and means for transferring the cut segments from said segment feeding means,
   conveying means for receiving the segments transferred from said segment feeding means and for conveying said segments to a specified position,
   transfer and stacking means for transferring a plurality of segments conveyed to the specified position by said conveying means to a preset segment weighing position remote from said conveying means, and stacking up a plurality of segments at the segment weighing position, said transfer and stacking means further comprising:
   suction means for transferring the plurality of segments conveyed to the specified position by said conveying means to the segment weighing position in batch, and segment receiving means disposed movably at the segment weighing position, wherein said suction means includes plural suction members disposed in a plurality of groups, and the operation of the suction members in each group is selectively controlled in response to the computed total areas of the segments conveyed to the specified position by said conveying means,
   weighing means installed at the segment weighing position for weighing the total weight of the segments stacked up by said transfer and stacking means,
   segment charging means for discharging the segments of specific weight in a stacked state after weighing by said weighing means in batch from the segment weighing position into the forming machine, and
   control means for controlling the operation of said segment feeding means, said conveying means, said transfer and stacking means and said segment charging means to deliver a predetermined weight of adhesive sheet material to said forming machine, said control means includes means for controlling the operation of the suction means and the segment receiving means so that the segments max be neatly stacked upon said segment receiving means and controls for feeding additionally cut and fed segments to said segment charging means in response to a measured deficiency in segment weight measured by said weighing means.

9. An automatic feeder of adhesive sheet material for feeding along adhesive sheet material having both sides protected with parting films into a forming machine in predetermined weight amounts comprising:
   segment feeding means including means for separating parting films from both sides of the adhesive sheet material, means for cutting the adhesive sheet material cleared from the parting films into segments of specified size sequentially, and means for transferring the cut segments from said segment feeding means,
   conveying means for receiving the segments transferred from said segment feeding means and for conveying said segments to a specified position,
   transfer and stacking means for transferring a plurality of segments conveyed to the specified position by said conveying means to a preset segment weighing position remote from said conveying means, and stacking up a plurality of segments at the segment weighing position,
   weighing means installed at the segment weighing position for weighing the total weight of the segments stacked up by said transfer and stacking means,
   segment charging means for discharging the segments of specific weight in a stacked state after weighing by said weighing means in batch from the segment weighing position into the forming machine, wherein said segment charging means further comprises at least one pair of charging arms having a plurality of opposed arm members operative to scoop up the segments in a stacked state in batch on both sides of said segments to charge said segments into the forming machine, and control means for controlling the operation of said segment feeding means, said conveying means, said transfer and stacking means and said segment charging means to deliver a predetermined weight of adhesive sheet material to said forming machine, said control means including controls for feeding additionally cut and fed segments to said segment charging means in response to a measured deficiency in segment weight measured by said weighing means.

10. An automatic feeder of adhesive sheet material of claim 9, wherein said segment charging means further comprises deflection preventive means for preventing upward deflection occurring in the segments scooped up by said charging arms.

11. An automatic feeder of adhesive sheet material for feeding a long adhesive sheet material having both sides protected with parting films into a forming machine in predetermined weight amounts comprising:

segment feeding means including means for separating parting films from both sides of the adhesive sheet material, means for cutting the adhesive sheet material cleared from the parting films into segments of specified size sequentially, and means for transferring the cut segments from said segment feeding means, conveying means for receiving the segments transferred from said segment feeding means and for conveying said segments to a specified position, transfer and stacking means for transferring a plurality of segments conveyed to the specified position by said conveying means to a preset segment weighing position remote from said conveying means, and stacking up a plurality of segments at the segment weighing position, wherein said transfer and stacking means further comprises suction means for transferring the plurality of segments conveyed to the specified position by said conveying means in batch to the segment weighing position, segment receiving means disposed movably at the segment weighing position, weighing means installed at the segment weighing position for weighing the total weight of the segments stacked up by said transfer and stacking means, segment charging means for discharging the segments of specific weight in a stacked state after weighing by said weighting means in batch from the segment weighting position into the forming machine, including:

at least one pair of charging arms having a plurality of opposed arm members operative to scoop up the segments in a stacked state in batch on both sides said segments and to charge said segments into the forming machine, and said segment receiving means has means forming gaps in position corresponding to position of the arm members for permitting passage of the arm members of said charging arms through the segment receiving means, and control means for controlling the operation of said segment feeding means, said conveying means, said transfer and stacking means and said segment charging means to deliver a predetermined weight of adhesive sheet material to said forming machine, said control means including means for controlling the operation of the suction means and the segment receiving means so that the segments may be sequentially separated individually from the suction means and neatly stacked upon said segment receiving means, and said control means further including controls for feeding additionally cut and fed segments to said segment charging means in response to a measured deficiency in segment weight measured by said weighing means.

12. An automatic feeder of adhesive sheet material of claim 10, wherein said segment charging means further comprises deflection preventive means for preventing upward deflection occurring in the segments scooped up by said charging arms.

* * * * *